United States Patent
Okabe et al.

(10) Patent No.: US 9,923,640 B2
(45) Date of Patent: Mar. 20, 2018

(54) TRANSMISSION APPARATUS AND TRANSMISSION SYSTEM

(71) Applicant: FUJITSU LIMITED, Kawasaki-shi, Kanagawa (JP)

(72) Inventors: Ryou Okabe, Shinagawa (JP); Tomoo Takahara, Kawasaki (JP); Toshiki Tanaka, Setagaya (JP); Masato Nishihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 17 days.

(21) Appl. No.: 15/244,169

(22) Filed: Aug. 23, 2016

(65) Prior Publication Data

US 2017/0078027 A1 Mar. 16, 2017

(30) Foreign Application Priority Data

Sep. 15, 2015 (JP) ................. 2015-182247

(51) Int. Cl.
*H04B 10/58* (2013.01)
*H04B 10/079* (2013.01)
*H04J 14/02* (2006.01)
*H04B 10/564* (2013.01)

(52) U.S. Cl.
CPC ....... *H04B 10/58* (2013.01); *H04B 10/07953* (2013.01); *H04B 10/564* (2013.01); *H04J 14/0298* (2013.01)

(58) Field of Classification Search
CPC H04B 10/58; H04B 10/07953; H04B 10/564; H04J 14/0298
See application file for complete search history.

(56) References Cited

U.S. PATENT DOCUMENTS

| | | | | |
|---|---|---|---|---|
| 6,430,236 B1* | 8/2002 | Funakoshi | ........... | H04N 5/4446 348/E5.108 |
| 7,050,388 B2* | 5/2006 | Kim | ........................ | H04B 3/23 370/201 |
| 8,112,001 B2* | 2/2012 | Lowery | .............. | H04B 10/2543 398/158 |
| 2003/0053243 A1* | 3/2003 | Kubota | ................ | G11B 7/0953 360/75 |
| 2003/0128414 A1* | 7/2003 | Watanabe | ............ | H04B 10/299 359/237 |

(Continued)

FOREIGN PATENT DOCUMENTS

| | | |
|---|---|---|
| JP | 11-205240 | 7/1999 |
| WO | 2014-169774 | 10/2014 |

OTHER PUBLICATIONS

F. Devaux et al., "Simple Measurement of Fiber Dispersion and of Chirp Parameter of Intensity Modulated Light Emitter", Journal of Lightwave Technology, vol. 11, No. 12, Dec. 1993, pp. 1937-1940 (4 pages).

*Primary Examiner* — Danny Leung
(74) *Attorney, Agent, or Firm* — Fujitsu Patent Center

(57) ABSTRACT

A transmission apparatus including: a waveform shaper that performs spectrum correction on an optical signal converted from an electrical signal encoded by OFDM (Orthogonal Frequency Division Multiplexing); a converter that converts the optical signal on which the waveform shaper has performed the spectrum correction, into the electrical signal; and a nonlinear compensator that compensates for a nonlinear distortion with respect to the electrical signal converted by the converter.

15 Claims, 22 Drawing Sheets

(56) References Cited

U.S. PATENT DOCUMENTS

| | | | | |
|---|---|---|---|---|
| 2005/0163444 A1* | 7/2005 | Miyabe | G02B 6/02028 | 385/127 |
| 2007/0274354 A1* | 11/2007 | Chi | H01S 5/02284 | 372/29.022 |
| 2010/0177615 A1* | 7/2010 | Yamamoto | G11B 20/10009 | 369/59.22 |
| 2013/0181771 A1* | 7/2013 | Tsunetsugu | H03F 1/22 | 330/69 |
| 2013/0272719 A1* | 10/2013 | Yan | H04B 10/2507 | 398/159 |
| 2013/0299683 A1* | 11/2013 | Tamura | H01L 31/02327 | 250/216 |
| 2013/0328504 A1* | 12/2013 | Yavor | H05B 33/0815 | 315/307 |
| 2014/0003819 A1* | 1/2014 | Cho | H04W 72/04 | 398/96 |
| 2014/0212135 A1* | 7/2014 | Ji | H04Q 11/0066 | 398/51 |
| 2015/0355469 A1* | 12/2015 | Oguri | G02B 27/0911 | 359/223.1 |
| 2016/0036473 A1* | 2/2016 | Liu | H04L 25/03343 | 375/297 |
| 2017/0078027 A1* | 3/2017 | Okabe | H04B 10/58 | |

\* cited by examiner

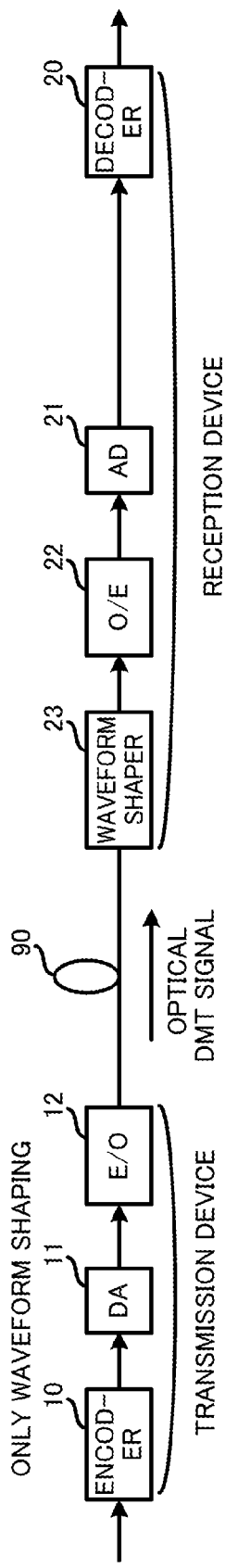
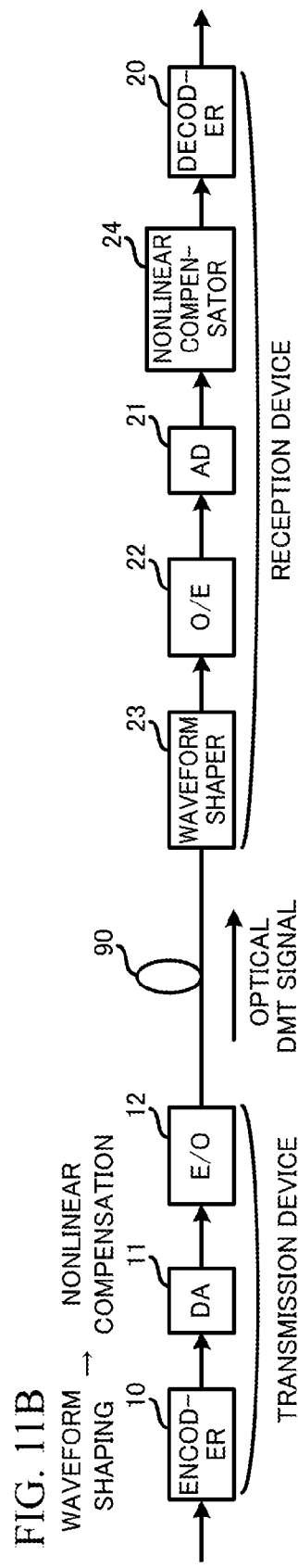
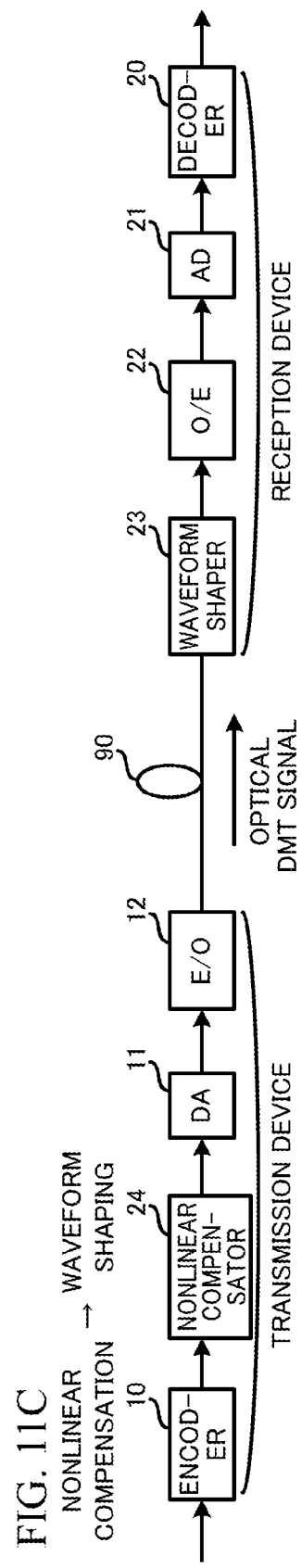
FIG. 11A ONLY WAVEFORM SHAPING
FIG. 11B WAVEFORM SHAPING → NONLINEAR COMPENSATION
FIG. 11C NONLINEAR COMPENSATION → WAVEFORM SHAPING

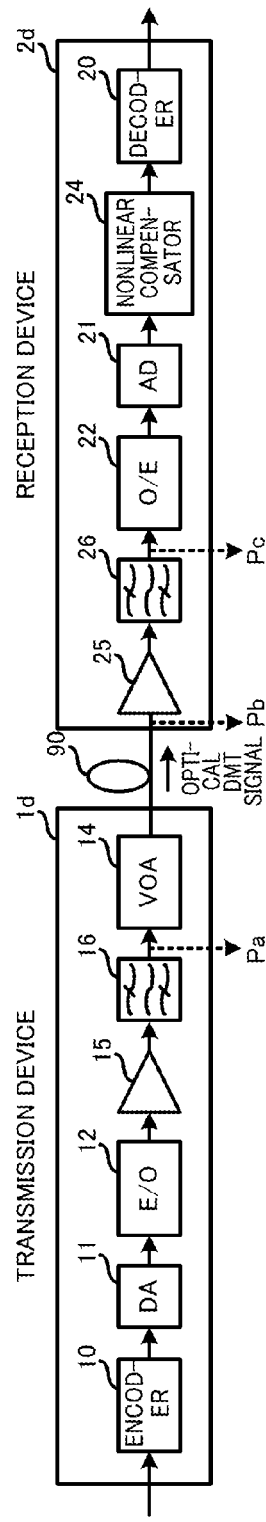

FIG. 21

| SPECTRUM CORRECTOR | LOSS | CONFIGURATION | DELAY | COMPENSATION AMOUNT | IMPLEMENTATION |
|---|---|---|---|---|---|
| VSB SHAPING (FILTER) | SMALL | SIMPLE | SMALL | ARBITRARY | TRANSMISSION/RECEPTION |
| SSB SHAPING (FILTER) | SMALL | SIMPLE | SMALL | ARBITRARY | TRANSMISSION/RECEPTION |
| SSB SHAPING (PHASE SHIFT METHOD) | LARGE | COMPLICATED | SMALL | ARBITRARY | TRANSMISSION/RECEPTION |
| DCF | LARGE | SIMPLE | LARGE | FIXED | TRANSMISSION/RECEPTION |
| VIPA | LARGE | COMPLICATED | SMALL | VARIABLE | TRANSMISSION/RECEPTION |
| FBG | SMALL | SIMPLE | SMALL | FIXED | TRANSMISSION/RECEPTION |
| PHASE CONJUGATION (OPC) | LARGE | COMPLICATED | MIDDLE | FIXED | RELAY |
| OPTICAL FOURIER TRANSFORM (OFT) | LARGE | COMPLICATED | MIDDLE | ARBITRARY | RECEPTION |

TRANSMISSION APPARATUS AND TRANSMISSION SYSTEM

CROSS-REFERENCE TO RELATED APPLICATION

This application is based upon and claims the benefit of priority of the prior Japanese Patent Application No. 2015-182247 filed on Sep. 15, 2015, the entire contents of which are incorporated herein by reference.

FIELD

A certain aspect of the embodiments is related to a transmission apparatus and a transmission system.

BACKGROUND

A transmission method of a discrete multi-tone (DMT) modulation scheme is used for a metallic line of an access system such as VDSL (Very high bit rate Digital Subscriber Line). Recently, applying the DMT modulation scheme to an optical transmission technique is researched and developed in accordance with the increase of traffic on a network.

The DMT modulation scheme is a multicarrier transmission technique based on an orthogonal frequency division multiplexing (OFMD) technique. In the DMT modulation scheme, data are allocated to a plurality of subcarriers (SC) having different frequencies, respectively, the allocated data is modulated based on a multilevel degree and a signal power in accordance with a transmission characteristic for each SC, and a result of the modulation is transmitted as a DMT signal. As a multiple-value modulation scheme used for data of each SC, Quadrature Phase Shift Keying (QPSK) and Quadrature Amplitude Modulation (QAM) are cited.

However, a dip occurs in a frequency characteristic of the DMT signal due to a chromatic dispersion on a transmission channel or due to interaction of the chromatic dispersion and a frequency chirp of a transmission device. When a specific frequency component of the DMT signal disappears by the dip (hereinafter referred to as "fading"), a signal-to-noise ratio (SNR) of a reception side deteriorates, and hence a transmission capacity and a transmission distance of the DMT signal reduce.

In response, an inventor tried to remove one of sidebands of an optical spectrum waveform of the DMT signal so as to reduce an influence of the fading (see e.g. Japanese Laid-open Patent Publication No. 11-205240), and to compensate for the nonlinearity of a response of an optical device such as an optical transmission device with the use of a digital filter (see e.g. U.S. Patent Publication No. 2013/0272719).

SUMMARY

According to an aspect of the embodiments, there is provided a transmission apparatus including: a waveform shaper that performs spectrum correction on an optical signal converted from an electrical signal encoded by OFDM (Orthogonal Frequency Division Multiplexing); a converter that converts the optical signal on which the waveform shaper has performed the spectrum correction, into the electrical signal; and a nonlinear compensator that compensates for a nonlinear distortion with respect to the electrical signal converted by the converter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11A is a diagram illustrating an example of the configuration of the transmission system performing only the VSB shaping;

FIG. 11B is a diagram illustrating an example of the configuration of the transmission system performing the nonlinear compensation after performing the VSB shaping;

FIG. 11C is a diagram illustrating an example of the configuration of the transmission system performing the VSB shaping after performing the nonlinear compensation;

FIG. 20A is a waveform diagram illustrating an example of the configuration of a transmission system implementing an optical amplifier;

FIG. 20B is a diagram illustrating the comparison of noise amounts of a nonlinear noise and an ASE (Amplified Spontaneous Emission) noise in accordance with functions of filers; and FIG. 21 is a diagram illustrating the comparison of a plurality of spectrum correctors.

DESCRIPTION OF EMBODIMENTS

In the trial of the inventor mentioned above, when one of the sidebands of the optical spectrum was removed, the occurrence of the dip in the frequency characteristic was prevented. However, since the signal component of the optical spectrum was reduced to half, the SNR decreased as a whole, and hence the transmission capacity and the transmission distance were not improved. Moreover, the compensation of the nonlinearity was ineffective since the specific frequency component disappeared.

Figure 1:
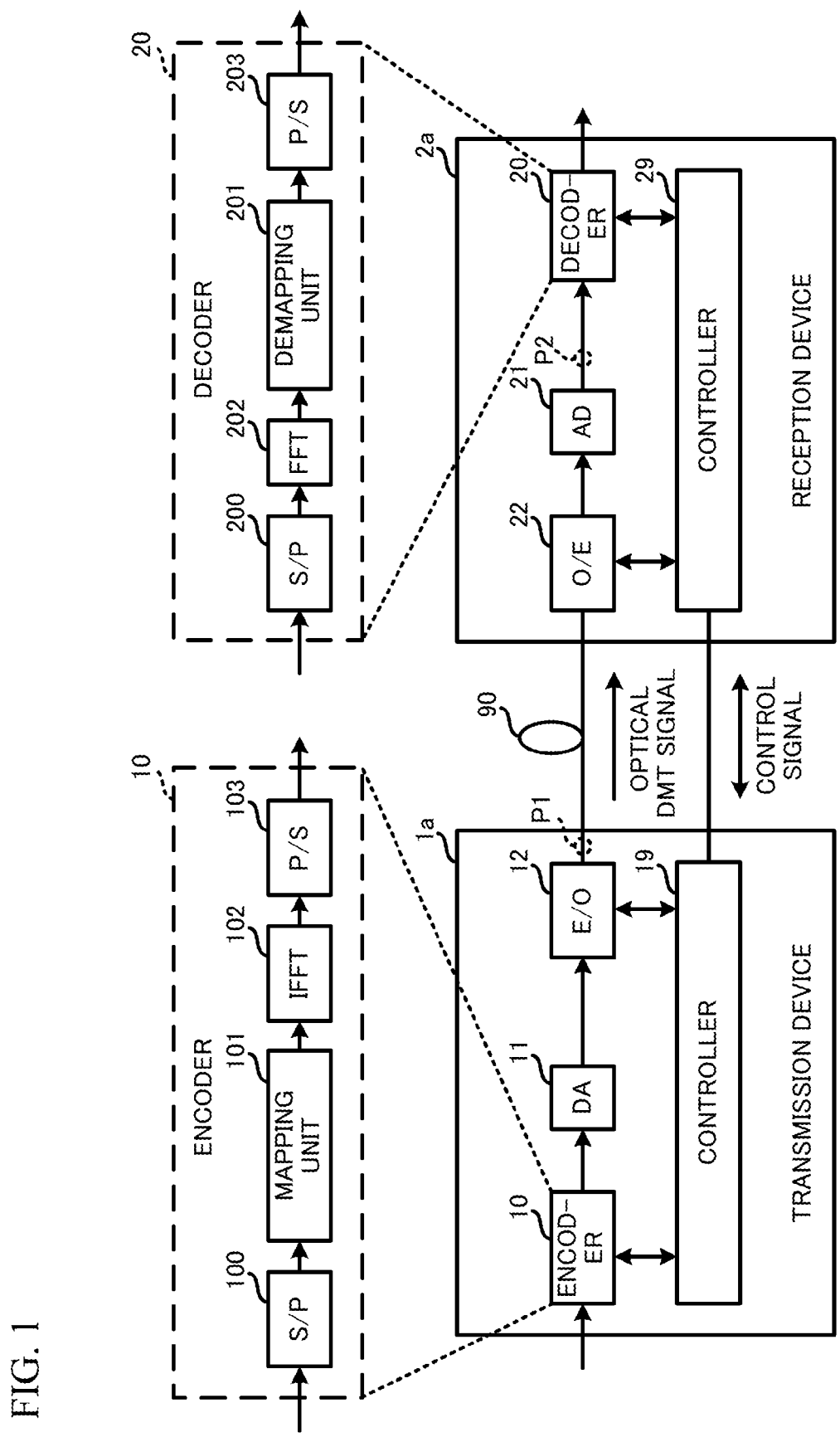
FIG. 1 is a diagram illustrating the configuration of a transmission system according to a comparative example.

FIG. 1 is a diagram illustrating the configuration of a transmission system according to a comparative example. The transmission system includes a transmission device 1a and a reception device 2a which are connected to each other via a transmission medium 90 such as an optical fiber. The transmission device 1a generates a DMT signal from a client signal inputted from another device in accordance with a DMT modulation scheme, and transmits the DMT signal to the reception device 2a. The reception device 2a receives the DMT signal from the transmission device 1a via the transmission medium 90, and decodes the DMT signal to the original client signal. Here, the transmission device 1a and the reception device 2a are examples of transmission apparatuses. The DMT modulation scheme is based on an OFDM (Orthogonal Frequency Division Multiplexing) modulation scheme, and the DMT signal is an example of an OFDM signal.

The transmission device 1a includes an encoder 10, a digital-analog (DA) converter 11, an electric/optical (E/O) converter 12 and a controller 19. The encoder 10 includes a serial/parallel (S/P) converter 100, a mapping unit 101, an inverse fast Fourier transform (IFFT) unit 102 and a parallel/serial (P/S) converter 103.

The encoder 10 performs the DMT modulation on the client signal to encode the client signal and generate the DMT signal. Here, the DMT signal is a multicarrier signal including a plurality of subcarriers (hereinafter referred to as "SC").

The S/P converter 100 converts serial data of the client signal into parallel data having the same number as the SC in the DMT signal. The mapping unit 101 maps parallel data in each SC based on a multilevel degree and a signal power allocated to each SC. The IFFT unit 102 performs the inverse fast Fourier transform on each mapped SC to generate the DMT signal. The P/S converter 103 converts the parallel data of the DMT signal into serial data and outputs the serial data to the DA converter 11.

The DA converter 11 converts the DMT signal from a digital signal to an analog signal, and outputs the analog signal to the E/O converter 12. The E/O converter 12 is an example of a first converter and a third converter, and converts the DMT signal from an electrical signal to an optical signal (hereinafter referred to as "an optical DMT signal"). The E/O converter 12 optically modulates the DMT signal by using a laser diode (LD), for example, and outputs the optical DMT signal to the transmission medium 90. Here, the E/O converter 12 may be composed of the LD and a lithium niobate (LiNbO$_3$) optical modulator or an optical modulator such as an electroabsorption optical modulator, and convert the DMT signal from the electrical signal to the optical signal.

The controller 19 performs the overall control of the transmission device 1a. The controller 19 performs the control by transmitting and receiving a control signal to/from the reception device 2a. For example, the controller 19 receives a measurement result of a transmission characteristic of a probe signal from the reception device 2a, and allocates the multilevel degree and the signal power to each SC based on the measurement result. The probe signal is an example of a test signal composed of the plurality of SCs having the same signal power, and is transmitted to the reception device 2a before the beginning of the operation of the transmission system.

The reception device 2a includes an optical/electric (O/E) converter 22, an analog-digital (AD) converter 21, a decoder 20, and a controller 29. The decoder 20 includes a serial/parallel (S/P) converter 200, a demapping unit 201, a fast Fourier transform (FFT) unit 202 and a parallel/serial (P/S) converter 203.

The O/E converter 22 converts the optical DMT signal transmitted from the transmission device 1a via the transmission medium 90 into an electrical signal (i.e., a DMT signal). The AD converter 21 converts the DMT signal from an analog signal to a digital signal, and outputs the digital signal to the decoder 20.

The decoder 20 decodes the DMT signal and reproduces the original client signal. The S/P converter 200 converts serial data of the DMT signal into parallel data for each SC in the DMT signal. The FFT unit 202 performs the fast Fourier transform on the parallel data of each SC, decodes the parallel data of each SC into parallel data before the conversion of the IFFT unit 102, and outputs the parallel data before the conversion of the IFFT unit 102 to the demapping unit 201.

The demapping unit 201 performs demapping processing on the parallel data before the conversion of the IFFT unit 102, and acquires parallel data of the client signal. The P/S converter 203 converts the parallel data of the client signal into the serial data of the client signal. The client signal reproduced in this way is outputted to another device. Here, each of the encoder 10 and the decoder 20 is composed of a DSP (Digital Signal Processor), for example.

The controller 29 performs the overall control of the reception device 2a. The controller 29 performs the control by transmitting and receiving a control signal to/from the transmission device 1a. For example, the controller 29 measures the transmission characteristic of the probe signal received from the transmission device 1a, and transmits the measurement result to the transmission device 1a.

Figure 2A:
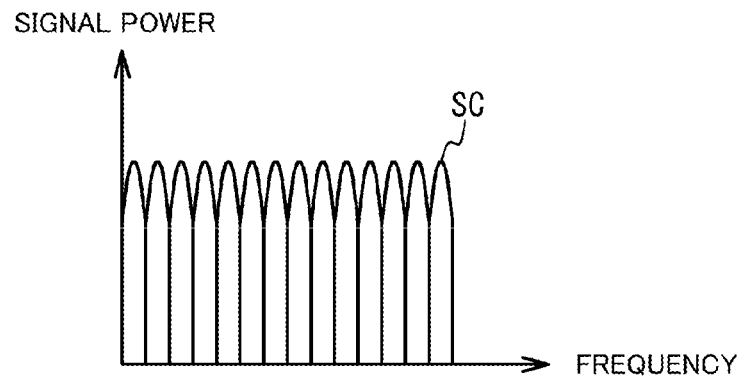
FIG. 2A is a diagram illustrating an example of a probe signal.

FIG. 2A is a diagram illustrating an example of the probe signal. In FIG. 2A, a horizontal axis denotes a frequency, and a vertical axis denotes a signal power.

The probe signal is a multicarrier signal which does not include the data of the client signal, and is composed of the plurality of SCs having the same signal power and the same multilevel degree. The controller 19 of the transmission device 1a performs the control so that the probe signal is transmitted to the reception device 2a before the operation of the transmission system is begun.

Figure 2B:
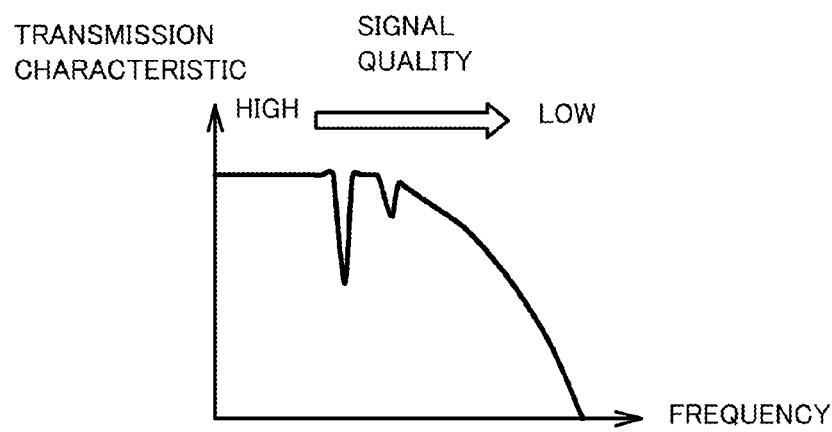
FIG. 2B is a diagram illustrating an example of a transmission characteristic of the probe signal.

FIG. 2B illustrates an example of the transmission characteristic of the probe signal. In FIG. 2B, the horizontal axis denotes the frequency, and the vertical axis denotes the transmission characteristic.

The controller 29 of the reception device 2a measures the transmission characteristic of the probe signal. The transmission characteristic indicates a signal quality such as a signal-to-noise ratio (SNR) and a bit error rate. In this example, the transmission characteristic decreases as the frequency increases. It is determined that the signal quality decreases as the frequency increases, and the signal quality increases as the frequency decreases. The controller 29 incorporates the measurement result of the transmission characteristic into the control signal, and transmits the control signal to the controller 19 of the transmission device 1a.

Figure 2C:
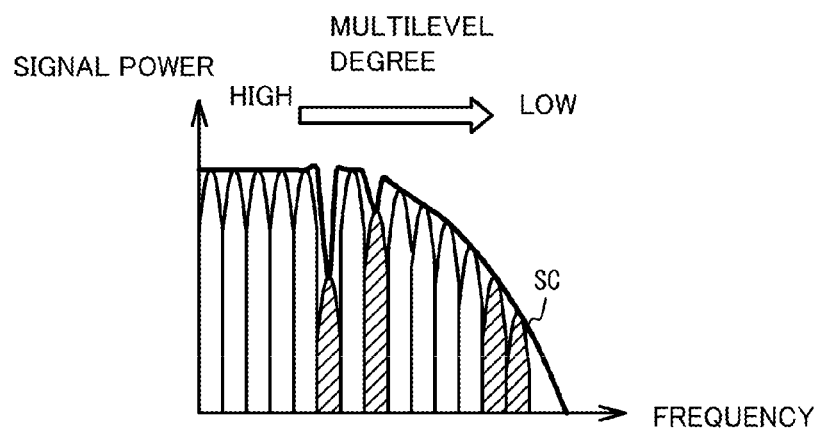
FIG. 2C is a diagram illustrating an example of allocation of a multilevel degree and a signal power to a subcarrier.

FIG. 2C illustrates an example of allocation of the multilevel degree and the signal power to the SC. In FIG. 2C, the horizontal axis denotes the frequency, and the vertical axis denotes the signal power.

The multilevel degree and the signal power are allocated to each SC based on the transmission characteristic illustrated in FIG. 2B. Data of each SC is modulated by a modulator in accordance with the allocated multilevel degree. As such a modulator, Quadrature Phase Shift Keying (QPSK) and Quadrature Amplitude Modulation (QAM) are cited. For example, the QPSK is used for data of the SCs having relatively low transmission characteristics (see the SCs with hatching).

Figure 3A:
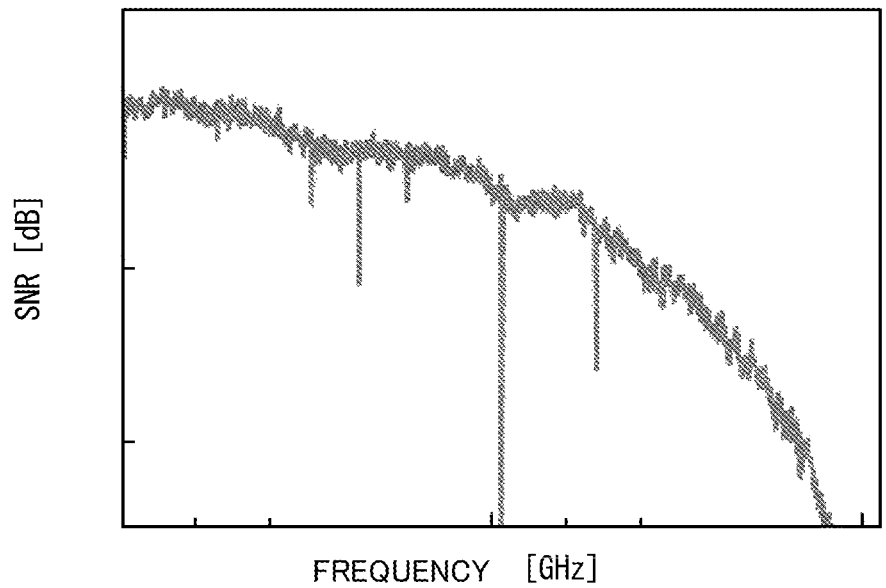
FIG. 3A is a diagram illustrating a SNR characteristic of the DMT signal when the transmission distance is 0 km.
Figure 3B:
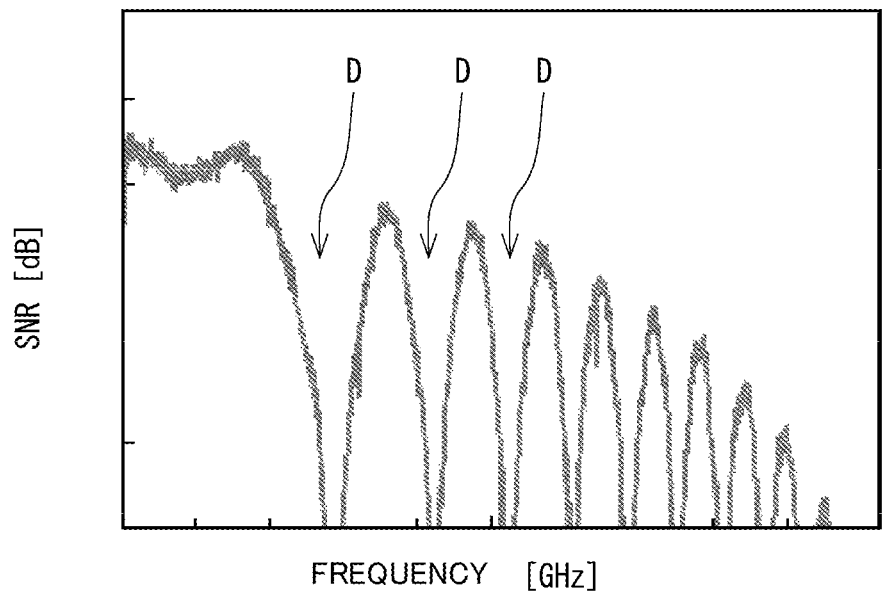
FIG. 3B is a diagram illustrating the SNR characteristic of the DMT signal when the transmission distance is 80 km.

FIG. 3A illustrates a SNR characteristic of the DMT signal when a transmission distance is 0 km. FIG. 3B illustrates the SNR characteristic of the DMT signal when the transmission distance is 80 km. In FIGS. 3A and 3B, the horizontal axis denotes the frequency (GHz), and the vertical axis denotes a SNR (dB).

As seen from the comparison of FIG. 3A and FIG. 3B, when the transmission distance of the DMT signal is long, dips D occur in the frequency characteristic due to a chromatic dispersion in the transmission medium 90 or due to interaction of the chromatic dispersion and a frequency chirp of the E/O 12. When specific frequency components of the DMT signal disappear by the dips D, the SNR characteristic of the reception device 2a deteriorates, and hence the transmission capacity and the transmission distance of the DMT signal reduce.

Figure 4:
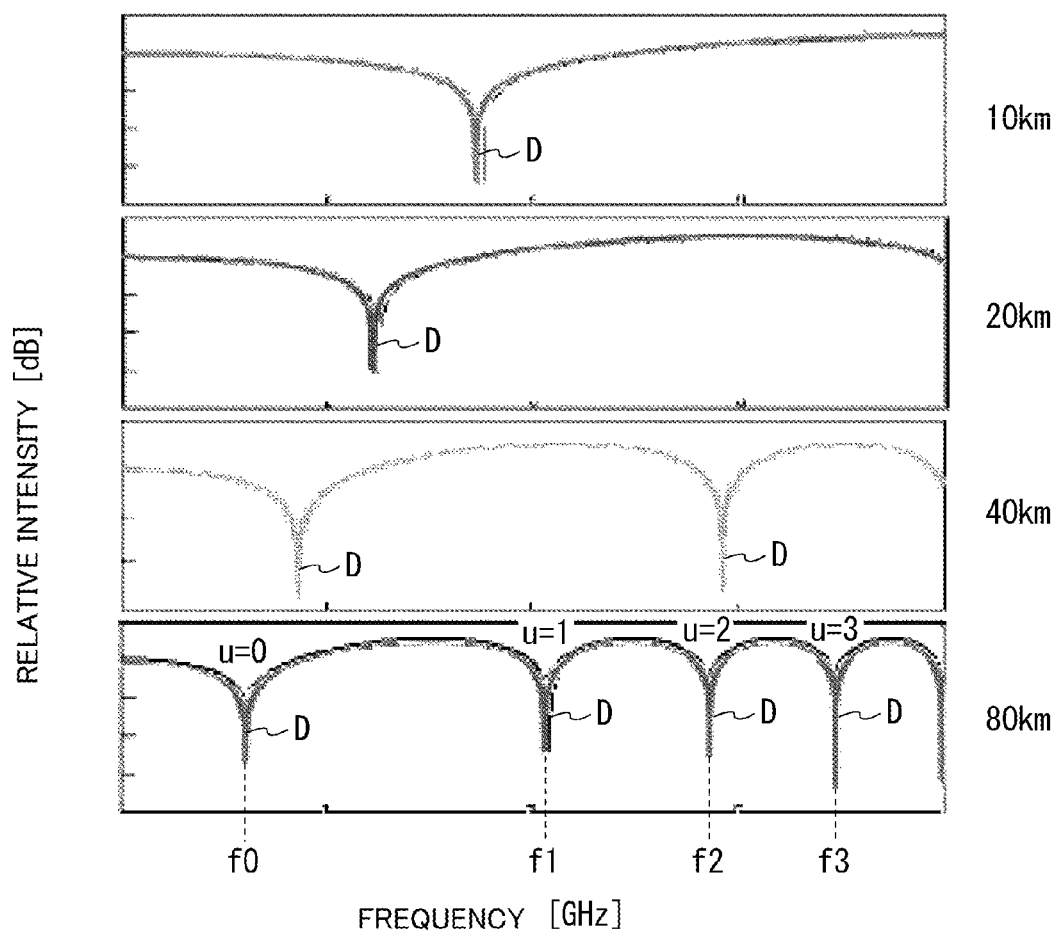
FIG. 4 is a diagram illustrating examples of the occurrence of dips in accordance with distances.

Examples of the occurrence of the dips in accordance with distances are illustrated in FIG. 4. FIG. 4 illustrates a relative intensity (dB) with respect to the frequency (GHz) when the transmission distances of the transmission medium 90 of a single mode fiber are 10 km, 20 km, 40 km and 80 km as an example. As the transmission distance becomes long as seen from FIG. 4, the occurrence of the dips increases.

$$fu^2 L = (c/2D\lambda^2) \times \{1 + 2u - (2/\pi)\arctan(\alpha)\} \quad (1)$$

The frequency fu (u=1, 2, 3, . . . ) at which the dip D occurs is calculated by an expression (1) mentioned above. In the expression (1), a variable "L" is the transmission distance, a variable "c" is the velocity of light (about 300,000 km/s), and a variable "D" is a chromatic dispersion value. A variable "λ" is a wavelength of the optical DMT signal, and a variable "α" is the frequency chirp. Here, in the case of the single mode fiber, the chromatic dispersion value D is 17 (ps/nm/km). The frequency chirp a is an eigenvalue of the E/O 12 of the transmission device.

A variable "u" is a number of the dip D. FIG. 4 illustrates frequencies f0 to f3 of the dips D corresponding to "u=0 to 3" when the transmission distance is 80 km as an example.

To avoid the deterioration of the SNR characteristic by the dips D, one of sidebands of an optical spectrum of the DMT signal is considered to be removed so as to reduce an influence of the fading. For example, vestigial sideband (VSB) shaping in which a filter removes a vestigial sideband (VSB) from the optical spectrum may be performed at a position of a mark P1 in FIG. 1.

Figure 5A:
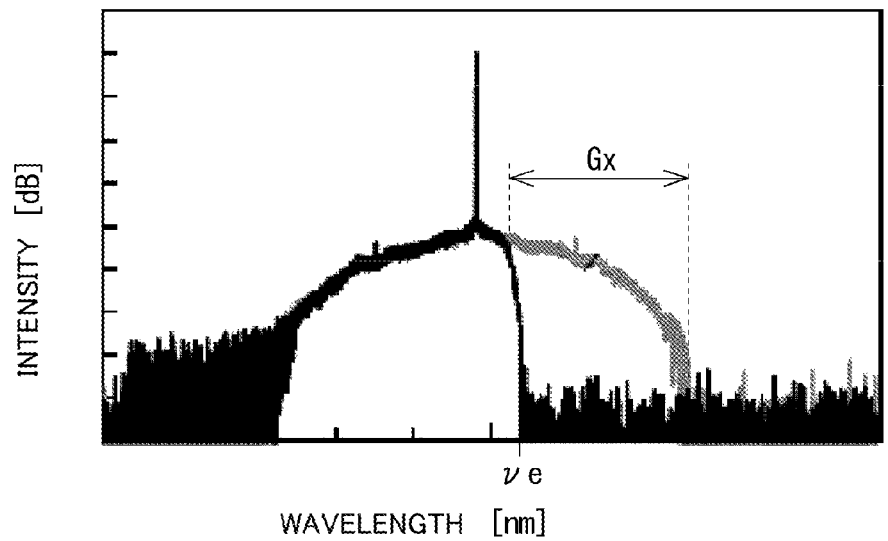
FIG. 5A is a diagram illustrating an example of VSB (Vestigial Side Band) shaping of an optical spectrum.

FIG. 5A illustrates an example of the VSB shaping of the optical spectrum. In FIG. 5A, the horizontal axis denotes a wavelength (nm), and a vertical axis denotes an intensity (dB). In this example, a right side part Gx of the optical spectrum is removed in a front view.

For example, the VSB shaping is performed by controlling a transmission band of the filter. At this time, an edge frequency (corresponding to a wavelength ve) of the transmission band of the filter is determined based on a frequency in which the SNR decreases only a constant level from a predetermined standard value in the transmission characteristic of the DMT signal.

Figure 5B:
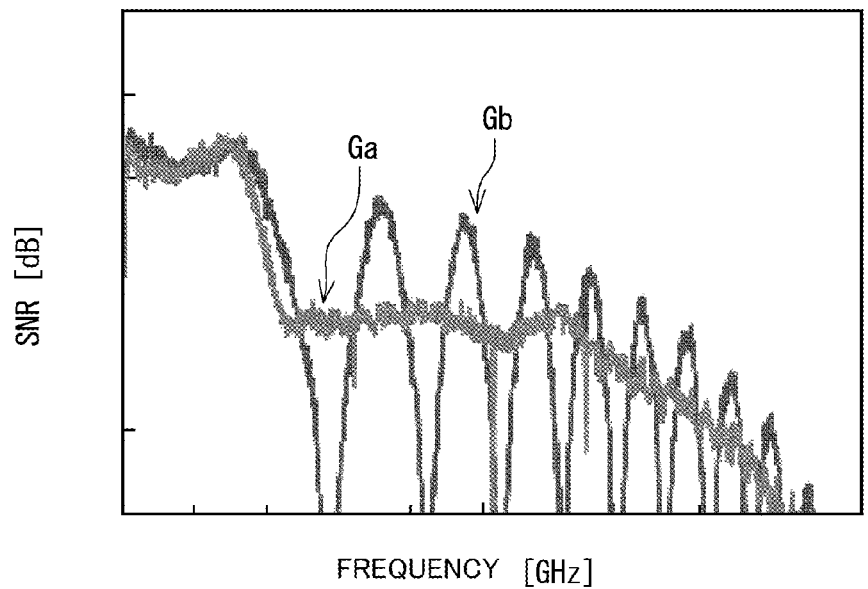
FIG. 5B is a diagram illustrating SNR characteristics of the DMT signal when the VSB shaping is performed and when the VSB shaping is not performed.

FIG. 5B illustrates SNR characteristics of the DMT signal when the VSB shaping is performed and when the VSB shaping is not performed. In FIG. 5B, the horizontal axis denotes the frequency (GHz), and the vertical axis denotes the SNR (dB). A mark Ga denotes the SNR characteristic when the VSB shaping is performed. A mark Gb denotes the SNR characteristic when the VSB shaping is not performed. In FIG. 5B, the SNR characteristics when the transmission distance is 80 km are illustrated, and the SNR characteristic Gb when the VSB shaping is not performed is the same as the SNR characteristic of FIG. 3B.

When the VSB shaping is performed, the occurrence of the dips D in the frequency characteristic is prevented as seen from the SNR characteristic Ga. However, since a width of the optical spectrum is reduced to half, the SNR decreases as a whole compared with the SNR characteristic Gb, and hence the transmission capacity and the transmission distance are not improved.

As another method for avoiding the deterioration of the SNR characteristic by the dips D, the nonlinearity of a response of an optical device such as an optical transmission device is considered to be compensated with the use of a digital filter, for example. For example, non-linear compensation may be performed on the DMT signal at a position of a mark P2 in FIG. 1.

Figure 6:
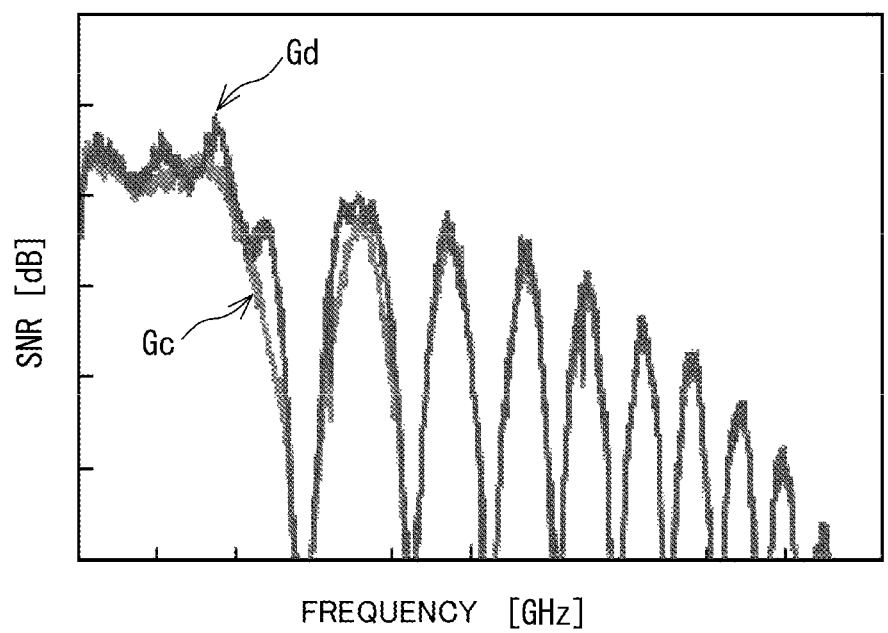
FIG. 6 is a diagram illustrating SNR characteristics of the DMT signal when nonlinear compensation is performed and when the nonlinear compensation is not performed.

FIG. 6 illustrates the SNR characteristics of the DMT signal when the nonlinear compensation is performed and when the nonlinear compensation is not performed. In FIG. 6, the horizontal axis denotes the frequency (GHz), and the vertical axis denotes the SNR (dB). A mark Gd denotes the SNR characteristic when the nonlinear compensation is performed. A mark Gc denotes the SNR characteristic when the nonlinear compensation is not performed. In FIG. 6, the SNR characteristics when the transmission distance is 80 km are illustrated, and the SNR characteristic Gc when the nonlinear compensation is not performed is the same as the SNR characteristic of FIG. 3B.

As seen from the comparison of the SNR characteristics Gc and Gd, specific frequency components disappear, and hence the nonlinear compensation is not effective.

Accordingly, in the present embodiment, spectrum correction is performed on the DMT signal, and the nonlinear compensation is performed on the DMT signal so that a nonlinear response of the SNR characteristic is compensated by the spectrum correction. Thereby, the transmission characteristic is improved.

Figure 7:
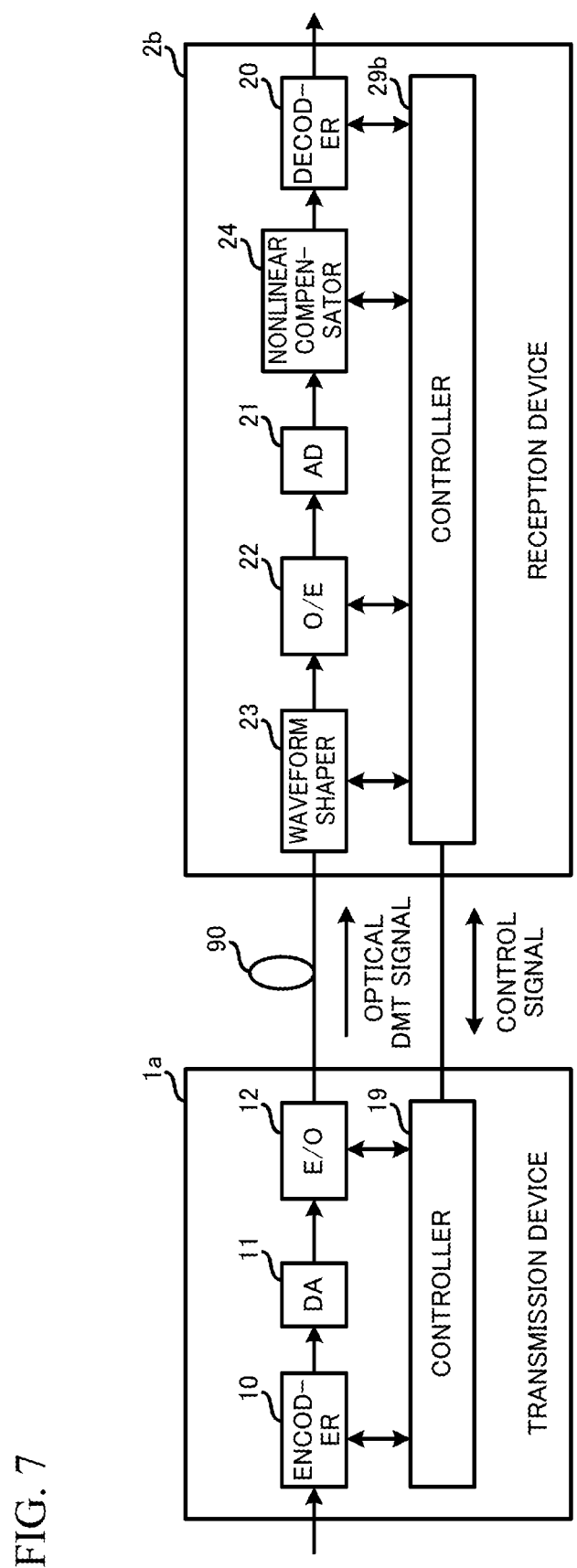
FIG. 7 is a diagram illustrating the configuration of a transmission system according to a first embodiment.

FIG. 7 is a diagram illustrating the configuration of a transmission system according to a first embodiment. In FIG. 7, elements common to those of FIG. 1 are designated by the same reference numerals and description thereof is omitted.

The transmission system includes the transmission device 1a that is an example of a first transmission apparatus, and a reception device 2b that is an example of a second transmission apparatus. The transmission device 1a transmits the optical DMT signal to the reception device 2b via the transmission medium 90. The reception device 2b receives the optical DMT signal from the transmission device 1a.

The transmission device 1a includes the encoder 10, the DA converter 11, the E/O converter 12 and the controller 19, as described above. Here, the encoder 10 is an example of a generator that generates the DMT signal, and the E/O converter 12 is an example of a first converter that converts the DMT signal into the optical signal.

The reception device 2b includes a waveform shaper 23, the O/E converter 22, the AD converter 21, a nonlinear compensator 24, the decoder 20, and the controller 29. The waveform shaper 23 performs the spectrum correction on the optical DMT signal transmitted from the transmission device 1a. More specifically, the waveform shaper 23 performs the spectrum correction by removing at least a part of a spectrum component in one of the sidebands of the optical DMT signal. Thereby, the occurrence of the above-mentioned dips D is restrained, and the influence of the fading is reduced. Here, the optical DMT signal is converted from the electrical signal encoded by the DMT modulation in the transmission device 1a.

In the present embodiment, the filter performing the above-mentioned VSB shaping is mentioned as the waveform shaper 23, but the waveform shaper 23 is not limited to this. For example, the waveform shaper 23 may perform SSB (Single Side Band) shaping which removes a single side band of the optical spectrum waveform, instead of the VSB shaping. In this case, a filer or a SSB modulator is used as the waveform shaper 23.

The O/E converter 22 is an example of a second converter, and converts the DMT signal on which the waveform shaper 23 has performed the spectrum correction into the electrical signal. The nonlinear compensator 24 compensates for a nonlinear distortion with respect to the DMT signal acquired by the conversion of the O/E converter 22. The nonlinear compensator 24 is a digital filter to be applied to a time region of a signal as described later, and performs nonlinear compensation on the DMT signal so that the nonlinear response of the SNR characteristic by the spectrum correction of the waveform shaper 23 is compensated. The controller 29b controls the transmission band of the filter of the waveform shaper 23 based on the measurement result of the transmission characteristic of the probe signal.

Figure 8:
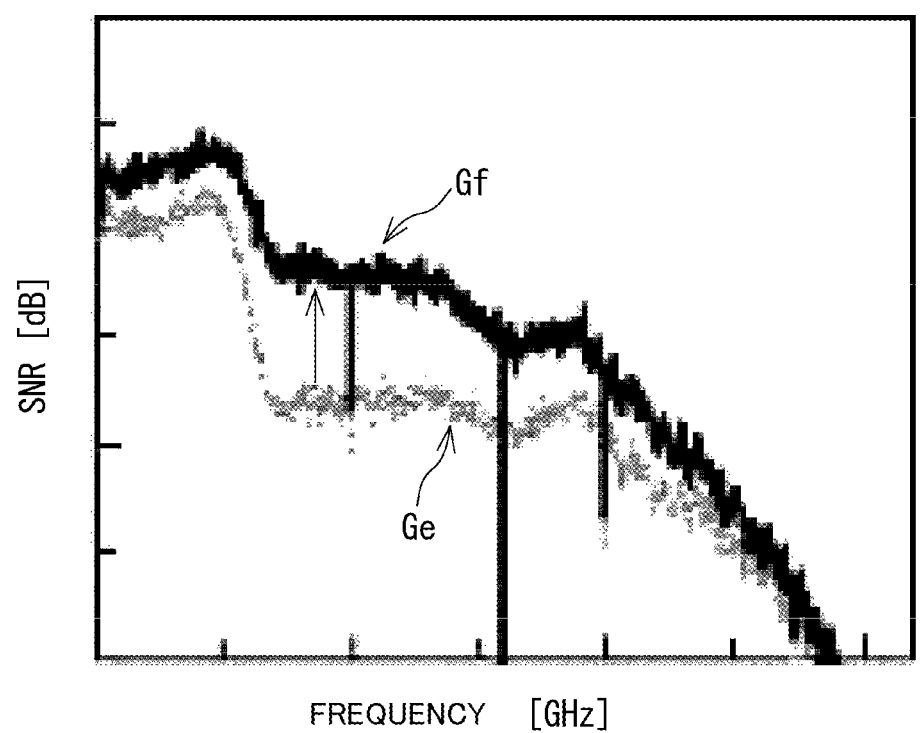
FIG. 8 is a diagram illustrating SNR characteristics of the DMT signal in which the VSB shaping has been performed before and after the nonlinear compensation is performed.

FIG. 8 is a diagram illustrating the SNR characteristics of the DMT signal in which the VSB shaping has been performed before and after the nonlinear compensation is performed. In FIG. 8, the horizontal axis denotes the frequency (GHz), and the vertical axis denotes the SNR (dB).

A mark Ge denotes the SNR characteristic of the DMT signal in which the VSB shaping has been performed before the nonlinear compensation is performed. A mark Gf denotes the SNR characteristic of the DMT signal in which the VSB shaping has been performed after the nonlinear compensation is performed. As seen from the comparison of the SNR characteristics Ge and Gf, the nonlinear compensation is performed on the DMT signal, so that the SNR characteristic is improved (see an arrow). Therefore, the bit error rate of the DMT signal is also improved as described later.

Figure 9A:
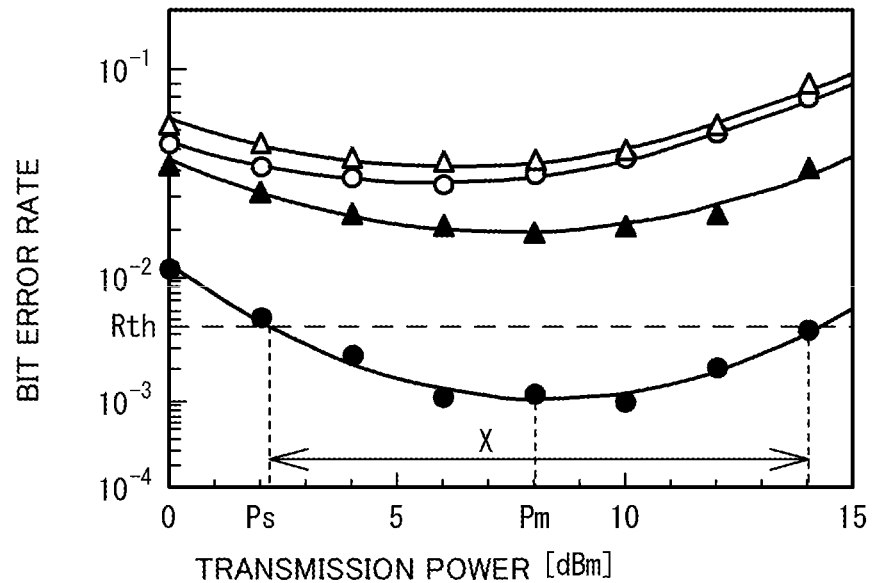
FIG. 9A is a diagram illustrating the change of a bit error rate of the DMT signal with respect to a transmission power.

FIG. 9A illustrates the change of the bit error rate of the DMT signal with respect to a transmission power. In FIG. 9A, the horizontal axis denotes a power of the E/O converter 12, i.e., a transmission power (dBm) of the optical DMT signal, and the vertical axis denotes the bit error rate.

In FIG. 9A, white triangle marks (see "△") denote the bit error rate when both of the VSB shaping and the nonlinear compensation are not performed. Black triangle marks (see "▲") denote the bit error rate when the VSB shaping is not performed and the nonlinear compensation is performed. Moreover, white circles (see "○") denote the bit error rate when the VSB shaping is performed and the nonlinear compensation is not performed. Black circles (see "■") denote the bit error rate when both of the VSB shaping and the nonlinear compensation are performed (i.e., the present embodiment).

When both of the VSB shaping and the nonlinear compensation are performed (see "■"), the bit error rate is less than a given threshold Rth in accordance with a standard of FEC (Forward Error Correction) in a wide range X (>10 (dB)) of the transmission power. Therefore, an effective range of the transmission power is expanded. On the other hand, in other cases, there is no range where the bit error rates is equal to or less than the threshold Rth.

Figure 9B:
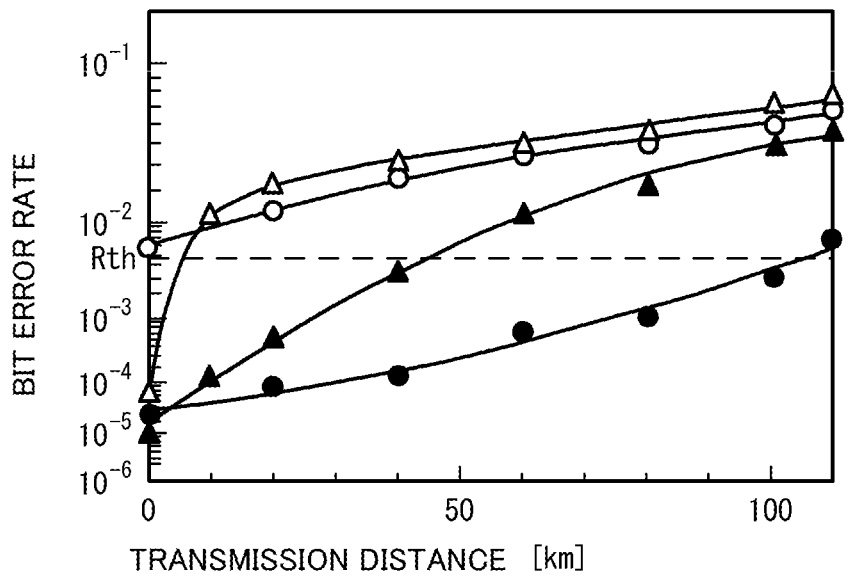
FIG. 9B is a diagram illustrating the change of the bit error rate of the DMT signal with respect to the transmission distance.

On the contrary, FIG. 9B illustrates the change of the bit error rate of the DMT signal with respect to the transmission distance. In FIG. 9B, the horizontal axis denotes the transmission distance (km) of the optical DMT signal, and the vertical axis denotes the bit error rate. Here, the meaning of each of the marks (see "△", "▲", "○" and "■") is mentioned above.

When both of the VSB shaping and the nonlinear compensation are performed (see "■"), the bit error rate is equal to or less than the threshold Rth in the transmission distance of 0 to 100 km. On the contrary, when only the nonlinear compensation is performed (see "▲"), the transmission distance in which the bit error rate is equal to or less than the threshold Rth is only 0 to 40 km. Moreover, when both of the VSB shaping and the nonlinear compensation are not performed (see "△"), the above-mentioned transmission distance is about 0 to 5 km.

Thus, both of the VSB shaping and the nonlinear compensation are performed, so that the effective transmission distance is approximately 20 times (=100/5) larger than that of the case where both of the VSB shaping and the nonlinear compensation are not performed.

In the first embodiment, the waveform shaper 23 is provided in the reception device 2b, but the setting position of the waveform shaper 23 is not limited to this. The waveform shaper 23 may be provided in the transmission device 1a, as described later.

Figure 10:
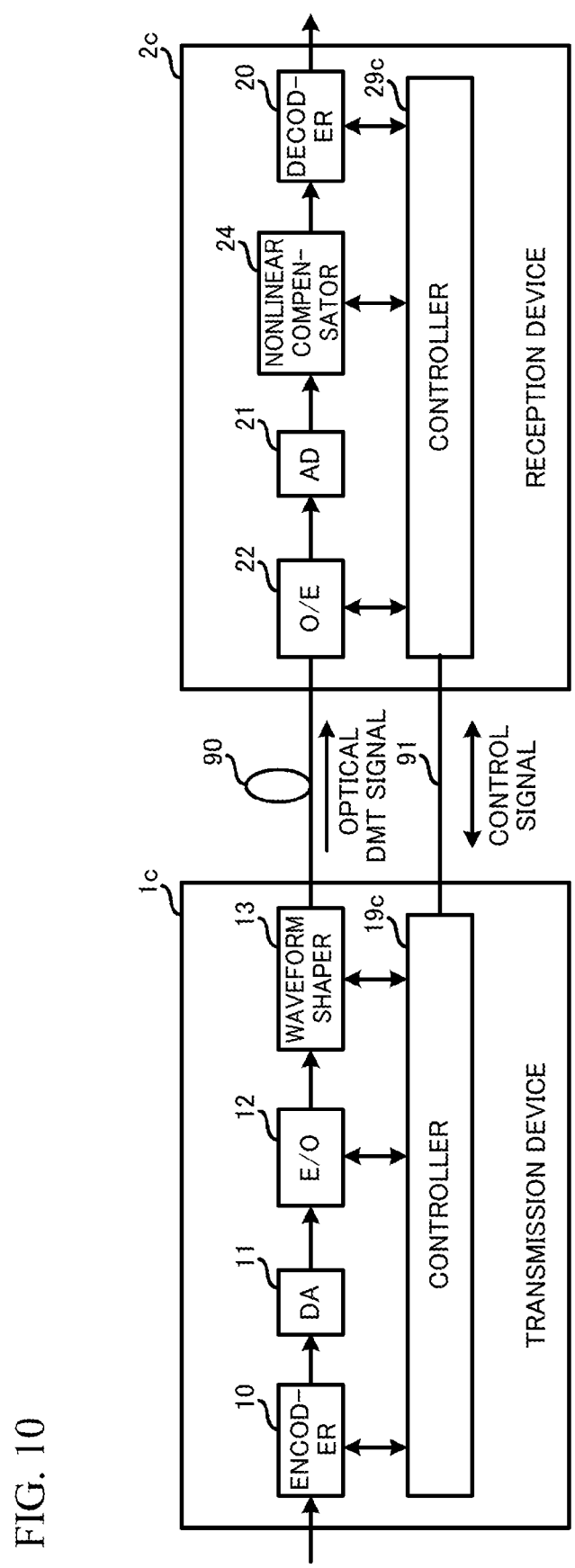
FIG. 10 is a diagram illustrating the configuration of a transmission system according to a second embodiment.

FIG. 10 is a diagram illustrating the configuration of a transmission system according to a second embodiment. In FIG. 10, elements common to those of FIG. 1 are designated by the same reference numerals and description thereof is omitted.

The transmission system includes a transmission device 1c which is an example of a first transmission apparatus, and a reception device 2c which is an example of a second transmission apparatus. The transmission device 1c transmits the optical DMT signal to the reception device 2c via the transmission medium 90, and the reception device 2c receives the optical DMT signal from the transmission device 1c.

The transmission device 1c includes the encoder 10, the DA converter 11, the E/O converter 12, a waveform shaper 13 and a controller 19c. Here, the E/O converter 12 is an example of a first converter which converts the DMT signal into the optical DMT signal.

The waveform shaper 13 performs the spectrum correction on the optical DMT signal converted by the E/O converter 12. More specifically, the waveform shaper 13 performs the spectrum correction by removing at least a part of a spectrum component in one of the sidebands of the optical DMT signal. Thereby, the occurrence of the above-mentioned dips D is restrained, and the influence of the fading is reduced.

In the present embodiment, the filter performing the above-mentioned VSB shaping is mentioned as the waveform shaper 13, but the waveform shaper 13 is not limited to this. For example, the waveform shaper 13 may perform SSB (Single Side Band) shaping which removes a single side band of the optical spectrum waveform, instead of the VSB shaping. In this case, a filer or a SSB modulator is used as the waveform shaper 13. Moreover, the controller 19c receives a measurement result of the transmission characteristic of the probe signal from a controller 29c of the reception device 2c, and controls the transmission band of the filter of the waveform shaper 13 based on the measurement result.

The reception device 2c includes the O/E converter 22, the AD converter 21, the nonlinear compensator 24, the decoder 20, and the controller 29c. The O/E converter 22 is an example of a second converter, and converts the DMT signal on which the waveform shaper 13 has performed the spectrum correction, into the electrical signal.

According to the present embodiment, the SNR characteristic that has decreased by the VSB shaping of the waveform shaper 13 is compensated by the nonlinear compensator 24, as with the first embodiment, and hence the present embodiment obtains the same effect as the first embodiment. Thus, the spectrum correction is previously performed on the DMT signal, and the nonlinear compensation is subsequently performed on the result of the spectrum correction, so that the transmission characteristic is improved. Hereinafter, an execution order of the spectrum correction and an execution order of the nonlinear compensation are mentioned together with the comparison of them.

FIG. 11A is a diagram illustrating an example of the configuration of the transmission system performing only the VSB shaping. FIG. 11B is a diagram illustrating an example of the configuration of the transmission system performing the nonlinear compensation after performing the VSB shaping. FIG. 11C is a diagram illustrating an example of the configuration of the transmission system performing the VSB shaping after performing the nonlinear compensation.

FIGS. 11A to 11C illustrate only elements through which the DMT signal or the optical DMT signal passes. In FIGS. 11A to 11C, elements common to those of FIG. 7 are designated by the same reference numerals and description thereof is omitted. Here, the elements of FIG. 11B are the elements of the first embodiment illustrated in FIG. 7.

Figure 12:
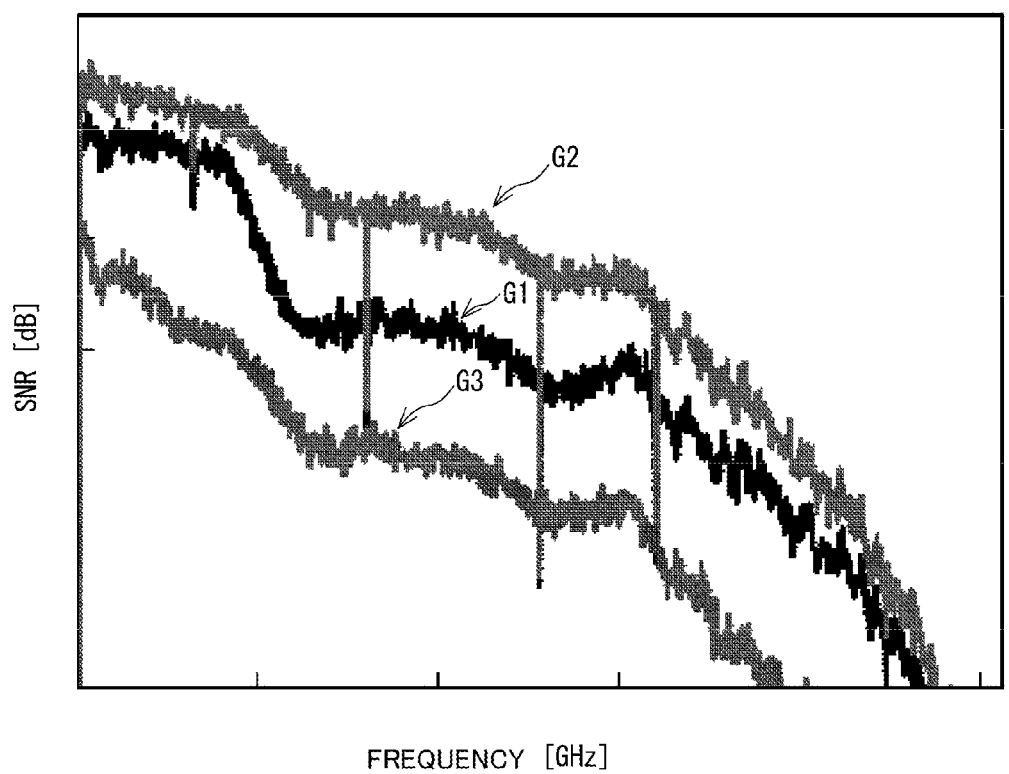
FIG. 12 is a diagram illustrating SNR characteristics of the DMT signal corresponding to examples of the configuration of FIGS. 11A to 11C.

FIG. 12 illustrates the SNR characteristics of the DMT signal corresponding to examples of respective configuration of FIGS. 11A to 11C. In FIG. 12, the horizontal axis denotes the frequency (GHz), and the vertical axis denotes the SNR (dB).

A mark G1 denotes the SNR characteristic in the case of the example of the configuration of FIG. 11A. A mark G2 denotes the SNR characteristic in the case of the example of the configuration of FIG. 11B. Moreover, a mark G3 denotes the SNR characteristic in the case of the example of the configuration of FIG. 11C.

As seen from FIG. 12, the SNR characteristic G2 in the case of the example of the configuration of FIG. 11B is the best. Therefore, to improve the transmission characteristic of the DMT signal, it is effective to previously perform the spectrum correction and subsequently perform the nonlinear compensation. Next, a description will be given of an example of the configuration of the nonlinear compensator 24.

Figure 13A:
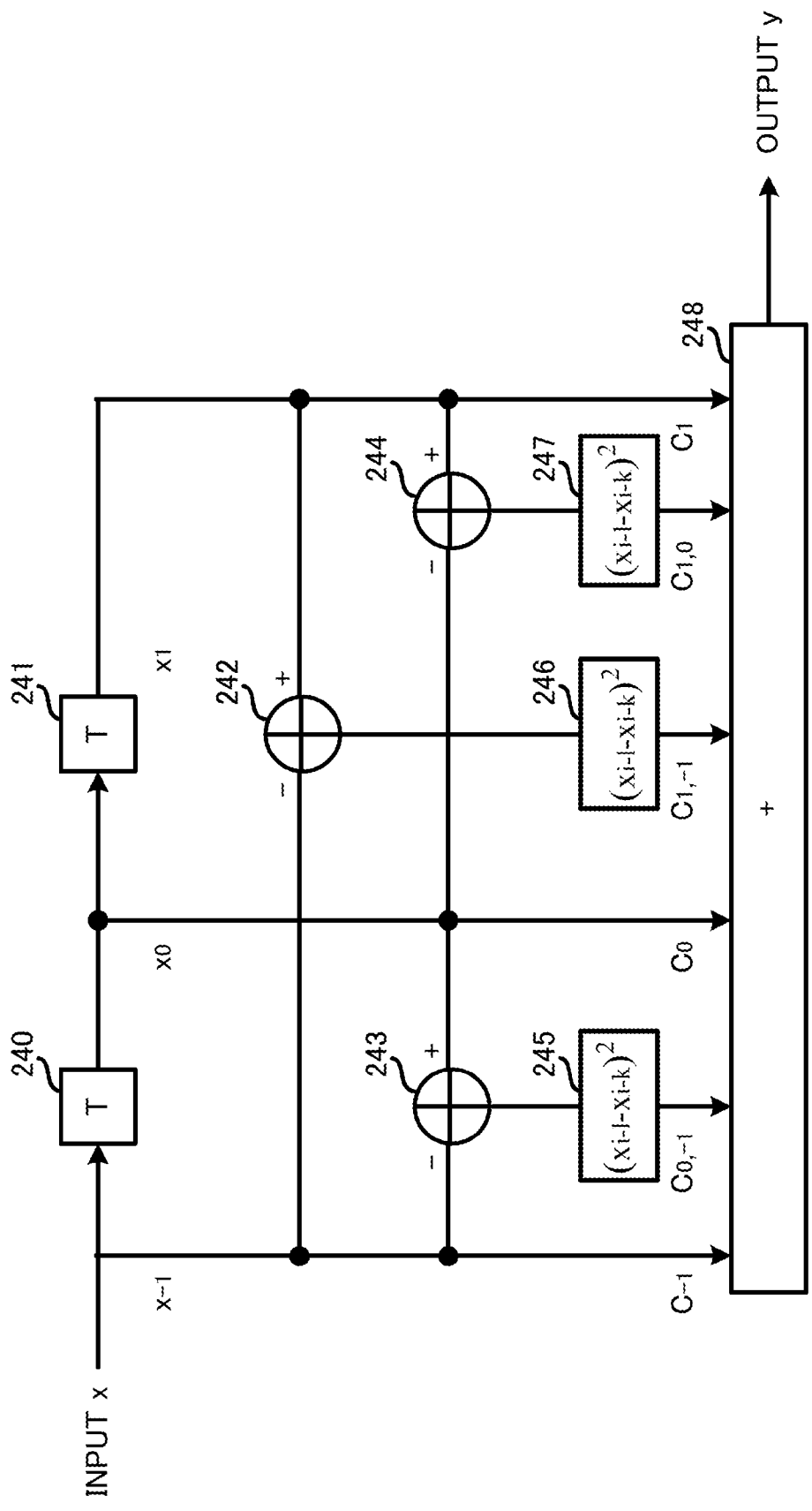
FIG. 13A is a diagram illustrating an example of the configuration of a nonlinear compensator.

FIG. 13A is a diagram illustrating an example of the configuration of the nonlinear compensator 24. The DMT signal is inputted to the nonlinear compensator 24 as an input x, and is outputted from the nonlinear compensator 24 as an output y.

The nonlinear compensator 24 includes delay units 240 and 241, adders 242 to 244, squarers 245 to 247, and a totalizer 248. The delay units 240 and 241 are connected in series with each other, and each of the delay units 240 and 241 gives a constant delay time τ to the input x. Thereby, in the nonlinear compensator 24, there are included an input $x_{-1}$ with no delay time τ, an input $X_0$ to which the delay time τ is given, and an input $x_1$ to which a delay time 2τ is given.

The adder 243 subtracts the input $x_{-1}$ from the input $x_0$ and outputs a subtracted result to the squarer 245. The adder 242 subtracts the input $x_{-1}$ from the input $x_1$ and outputs a subtracted result to the squarer 246. The adder 244 subtracts the input $x_0$ from the input $x_1$ and outputs a subtracted result to the squarer 247. Each of the squarers 245 to 247 squares an input value and outputs a squared value.

The totalizer 248 calculates a total of a multiplication value of the input $x_{-1}$ and a coefficient $C_{-1}$, a multiplication value of an output value of the squarer 245 and a coefficient $C_{0,-1}$, a multiplication value of the input $x_0$ and a coefficient $C_0$, a multiplication value of an output value of the squarer 246 and a coefficient $C_{1,-1}$, a multiplication value of the input $x_1$ and a coefficient $C_1$, and a multiplication value of an output value of the squarer 247 and a coefficient $C_{1,0}$, as the output y.

$$y = \sum_{k=-N}^{N} C_k x_{i-k} + \sum_{l=-N}^{N} \sum_{k=-N}^{l-1} C_{l,k}(x_{i-l} - x_{i-k})^2 \qquad (2)$$

The nonlinear compensator 24 is expressed like an expression (2) mentioned above. However, in the nonlinear compensator 24 illustrated in FIG. 13A, "N=1" is set to the expression (2). Moreover, coefficients $C_k$ and $C_{1,k}$ (are decided and set by the controller 29b or 29c, based on the transmission characteristic of the probe signal. Here, the coefficient $C_k$ is a linear weight coefficient, and the coefficient $C_{1,k}$ (is a nonlinear weight coefficient.

Figure 13B:
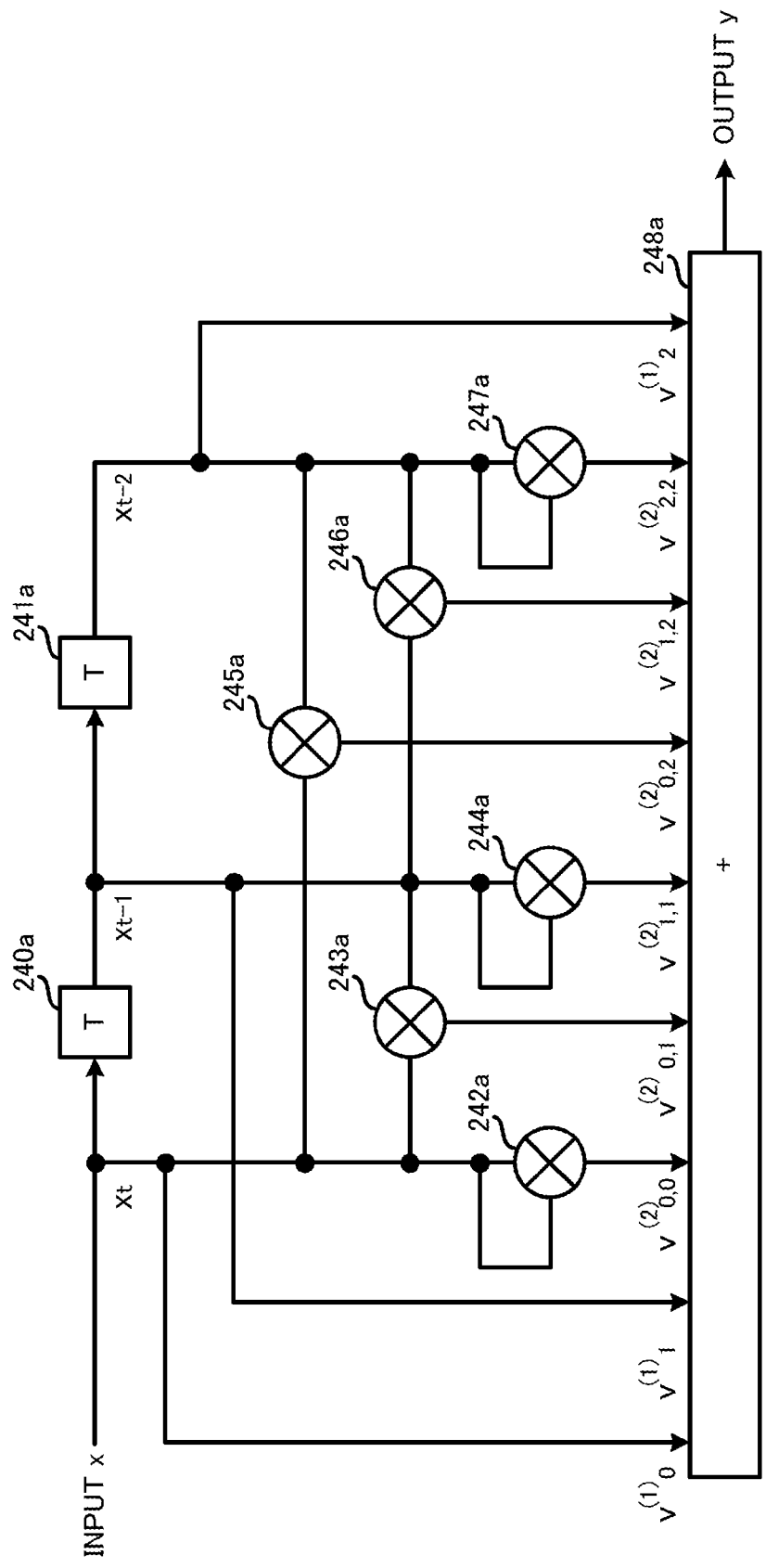
FIG. 13B is a diagram illustrating another example of the configuration of the nonlinear compensator.

FIG. 13B is a diagram illustrating another example of the configuration of the nonlinear compensator 24. FIG. 13B is an example of a nonlinear compensation circuit to be applied to a second term of the expression (2) mentioned above. The DMT signal is inputted to the nonlinear compensator 24 as the input x, and is outputted from the nonlinear compensator 24 as the output y.

The nonlinear compensator 24 includes delay units 240a and 241a, multipliers 242a to 247a, and a totalizer 248a. The delay units 240a and 241a are connected in series with each other, and each of the delay units 240a and 241a gives the constant delay time τ to the input x. Thereby, in the nonlinear compensator 24, there are included an input $x_t$ with no delay time τ, an input $x_{t-1}$ to which the delay time τ is given, and an input $x_{t-2}$ to which a delay time 2τ is given.

The multiplier 242a multiplies the input $x_t$ by the input $x_t$, and outputs a multiplied result to the totalizer 248a. The multiplier 243a multiplies the input $x_{t-1}$ by the input $x_t$ and outputs a multiplied result to the totalizer 248a. The multiplier 244a multiplies the input $x_{t-1}$ by the input $x_{t-1}$, and outputs a multiplied result to the totalizer 248a. The multiplier 245a multiplies the input $x_{t-2}$ by the input $x_t$, and outputs a multiplied result to the totalizer 248a. The multiplier 247a multiplies the input $x_{t-2}$ by the input $x_{t-2}$, and outputs a multiplied result to the totalizer 248a. The multiplier 246a multiplies the input $x_{t-1}$ by the input $x_{t-2}$, and outputs a multiplied result to the totalizer 248a.

The totalizer 248a calculates a total of a multiplication value of the input $x_t$ and a coefficient $V^{(1)}_0$, a multiplication value of the input $x_{t-1}$ and a coefficient $V^{(1)}_1$, a multiplication value of the input $x_{t-2}$ and a coefficient $V^{(1)}_2$, and respective multiplication values of output values of the multipliers 242a to 247a and coefficients $V^{(2)}_{0,0}$ to $V^{(2)}_{2,2}$, as the output y.

$$y = \sum_{k=0}^{N-1} x_{t-k} v_k^{(1)} + \sum_{k=0}^{N-1} \sum_{l=0}^{N-1} x_{t-k} x_{t-l} v_{k,l}^{(2)} \quad (3)$$

An expression (3) mentioned above is series expression of the digital filter based on a second-order Volterra series. In the expression (3), a coefficient $V^{(1)}_k$ is a primary nonlinear compensation coefficient (e.g. the nonlinear weight coefficient), and a coefficient $V^{(2)}_{k,l}$ is a secondary nonlinear compensation coefficient. Here, a degree is not limited to a secondary degree.

Thus, the nonlinear compensator 24 is a digital filter based on a polynomial structure. Therefore, referring to FIG. 8 and as described above, the nonlinear compensator 24 can more effectively compensate the nonlinear response of the SNR characteristic by the spectrum correction of the waveform shaper 13 or 23.

Moreover, if the transmission distance is less than 40 km as seen from FIG. 9B, when only the nonlinear compensation without the VSB shaping is performed on the DMT signal, the error rate can be made to be equal to or less than the threshold Rth (see "▲"). Therefore, the waveform shaper 13 or 23 may switch execution/non-execution of the VSB shaping in accordance with the transmission distance, as described later.

Figure 14:
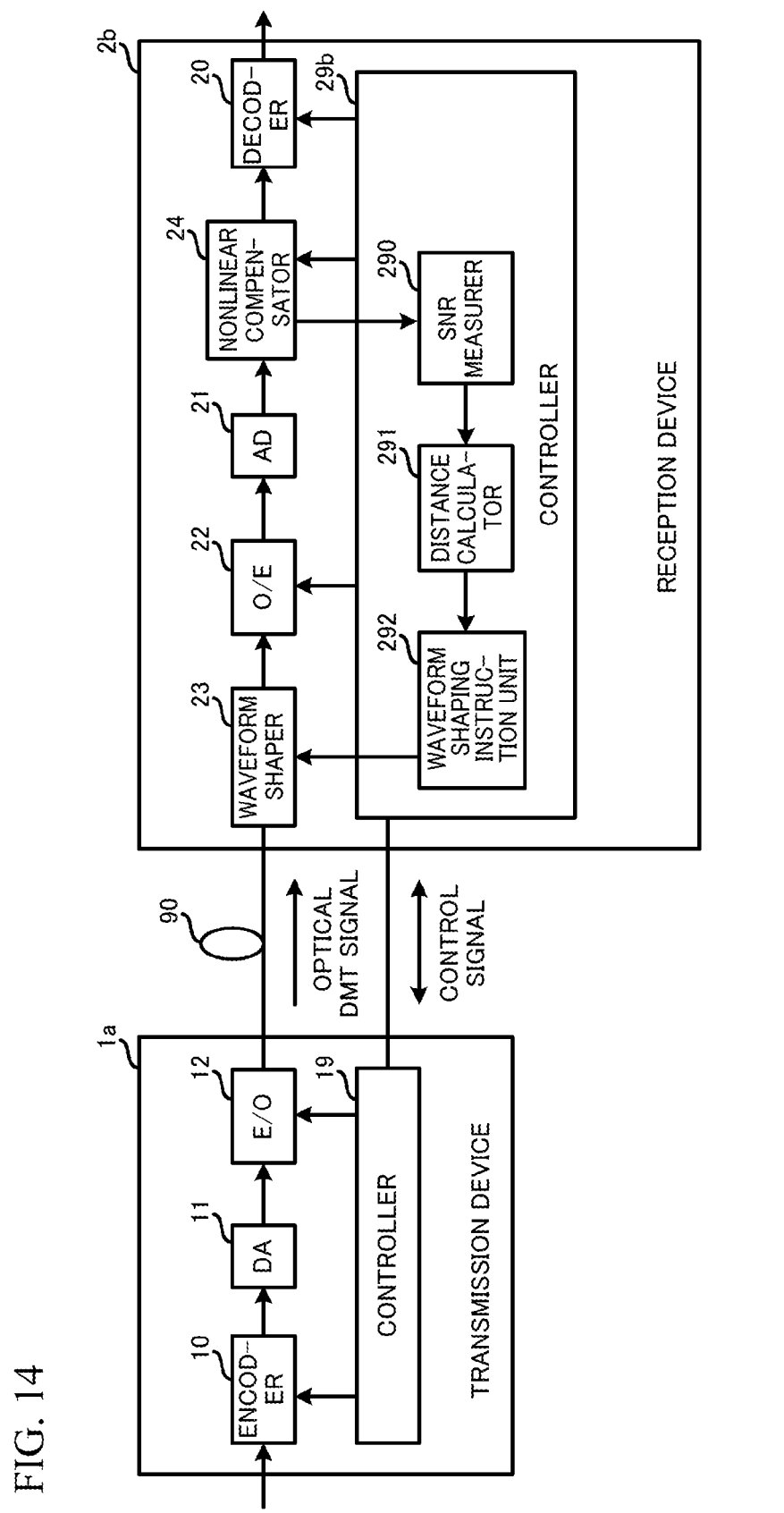
FIG. 14 is a diagram illustrating the configuration of a transmission system according to a variation example of the first embodiment.

FIG. 14 is a diagram illustrating the configuration of a transmission system according to a variation example of the first embodiment. In FIG. 14, elements common to those of FIG. 7 are designated by the same reference numerals and description thereof is omitted.

In this example, the controller 29b of the reception device 2b includes a SNR measurer 290, a distance calculator 291, and a waveform shaping instruction unit 292. The SNR measurer 290 is an example of a transmission characteristic measurer, and measures the transmission characteristic of the probe signal. More specifically, the SNR measurer 290 measures the SNR characteristic of the probe signal of the nonlinear compensator 24, and notifies the distance calculator 291 of information on the frequency fu at which the dip D occurs.

The distance calculator 291 is an example of a calculator, and calculates a parameter relating to the transmission distance of the optical DMT signal from the measurement result of the SNR characteristic. More specifically, the distance calculator 291 calculates a transmission distance L by using the frequency fu notified from the SNR measurer 290 and the expression (1) mentioned above. The distance calculator 291 notifies the waveform shaping instruction unit 292 of the calculated transmission distance L.

The waveform shaping instruction unit 292 instructs the waveform shaping to the waveform shaper 23 in accordance with the transmission distance L. More specifically, when the transmission distance L is less than 40 km, the waveform shaping instruction unit 292 outputs an instruction to the waveform shaper 23 so as not to perform the VSB shaping. When the transmission distance L is equal to or more than 40 km, the waveform shaping instruction unit 292 outputs an instruction to the waveform shaper 23 so as to perform the VSB shaping.

The waveform shaper 23 transmits all bands of the optical DMT signal without performing the VSB shaping according to the instruction of the waveform shaping instruction unit 292 when the transmission distance L is less than 40 km. The waveform shaper 23 performs the VSB shaping on the optical DMT signal according to the instruction of the waveform shaping instruction unit 292 when the transmission distance L is equal to or more than 40 km. That is, the waveform shaper 23 switches to any one of an operation that removes at least a part of the spectrum component in one of the sidebands of the optical DMT signal and an operation that transmits all bands of the optical DMT signal, depending on the parameter relating to the transmission distance L.

Thus, in this example, when the transmission distance L is less than 40 km, the VSB shaping is not performed, so that it is possible to achieve low power consumption and reduce the control time. Here, the parameter relating to the transmission distance L is not limited to the transmission distance L, and a residual dispersion value (=the transmission distance L×the chromatic dispersion value D) may be used as the parameter relating to the transmission distance L, for example. Moreover, a comparison value of the transmission distance L is 40 km in this example, but may be decided depending on a design. Hereinafter, a description will be given of control processing of the transmission system in this example.

Figure 15:
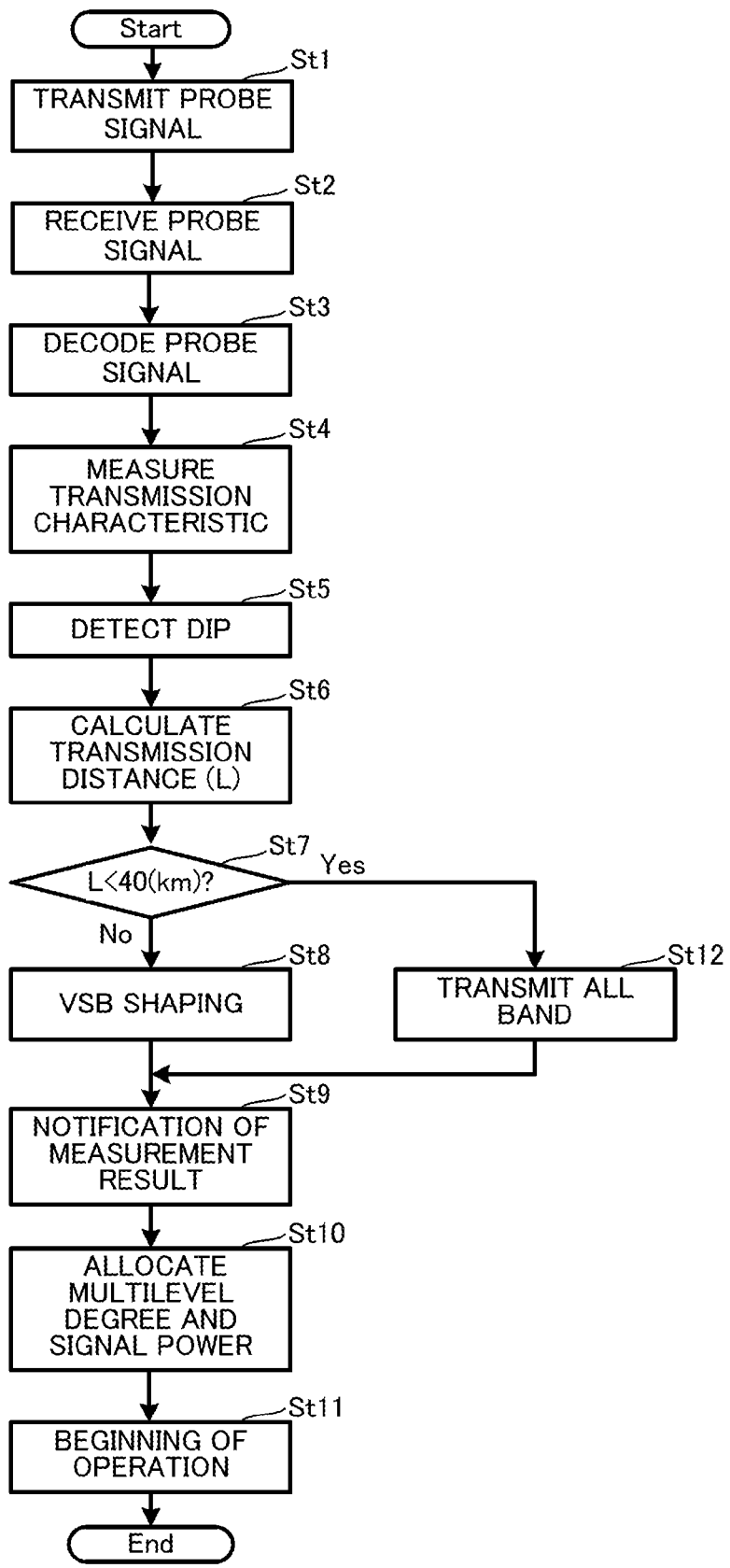
FIG. 15 is a flowchart illustrating an example of control processing of the transmission system.

FIG. 15 is a flowchart illustrating an example of the control processing of the transmission system. First, the transmission device 1a transmits the probe signal to the reception device 2b via the transmission medium 90 (step SU). Here, the probe signal may be generated in the transmission device 1a, or may be inputted from the outside to the transmission device 1a.

Next, the reception device 2b receives the probe signal transmitted from the transmission device 1a (step St2). Next, the decoder 20 of the reception device 2b decodes the probe signal (step St3). Next, the SNR measurer 290 of the reception device 2b measures the transmission characteristic including the SNR characteristic of the probe signal (step St4), and detects the frequency fu at which the dip D occurs, based on the SNR characteristic (step St5). Next, the distance calculator 291 calculates the transmission distance L based on the information of the frequency fu and the expression (1) (step St6).

When the transmission distance L is equal to more than 40 km (No in step St7), the waveform shaping instruction unit 292 instructs the VSB shaping to the waveform shaper 23 (step St8). When the transmission distance L is less than 40 km (Yes in step St7), the waveform shaping instruction unit 292 outputs the instruction to the waveform shaper 23 so as to transmit all bands of the optical DMT signal (step St12).

Next, the measurement result of the transmission characteristic such as the SNR characteristic is notified from the controller 29b of the reception device 2b to the controller 19 of the transmission device 1a (step St9). Next, the controller 19 of the transmission device 1a allocates the multilevel degree and the signal power to each SC, based on the notified measurement result (step St10). Next, the transmission device 1a and the reception device 2b begin the operation (step St11). That is, the transmission device 1a and the reception device 2b begin transmission of the DMT signal including the data of the client signal. In this way, the control processing of the transmission system is performed.

The above-mentioned control processing can be similarly performed in the transmission system of the second embodiment illustrated in FIG. 10.

Figure 16:
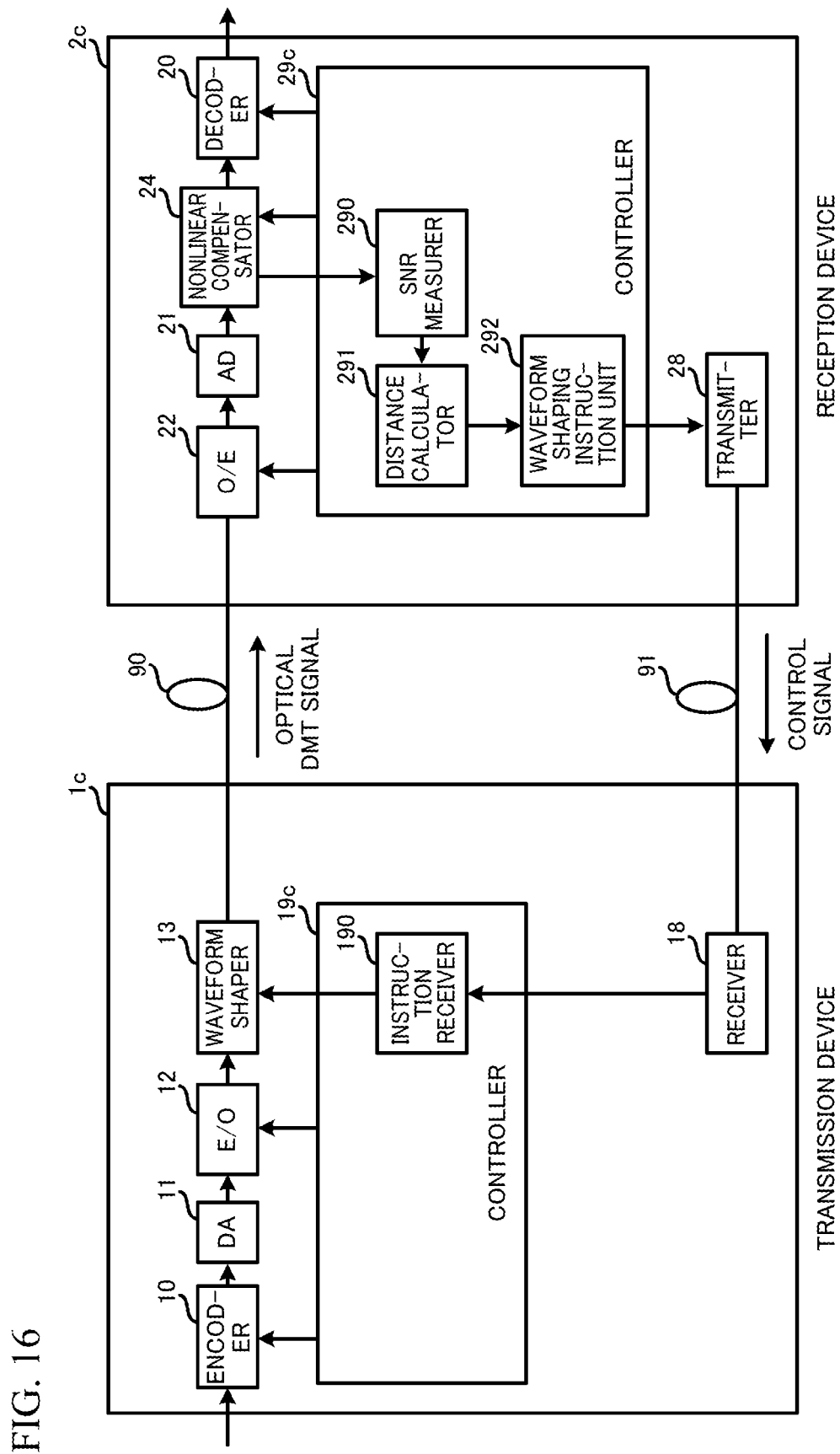
FIG. 16 is a diagram illustrating the configuration of a transmission system according to a first variation example of the second embodiment.

FIG. 16 is a diagram illustrating the configuration of a transmission system according to a first variation example of the second embodiment. In FIG. 16, elements common to those of FIGS. 10 and 14 are designated by the same reference numerals and description thereof is omitted.

The reception device 2c includes the O/E converter 22, the AD converter 21, the nonlinear compensator 24, the decoder 20, the controller 29c and a transmitter 28. The transmitter 28 transmits a control signal including the instruction of the waveform shaping instruction unit 292 to the transmission device 1c via a transmission channel 91 such as an optical fiber. Here, in this example, it is assumed that the transmission channel 91 for the control signal is provided separately from transmission medium 90 for the optical DMT signal.

The transmission device 1c includes the encoder 10, the DA converter 11, the E/O converter 12, the waveform shaper 13, the controller 19c and a receiver 18. The controller 19c includes an instruction receiver 190 that receives the instruction of the waveform shaping instruction unit 292. The receiver 18 receives the control signal from the transmitter 28 of the reception device 2c, and outputs the control signal to the instruction receiver 190.

The instruction receiver 190 controls the waveform shaper 13 based on the instruction of the waveform shaping instruction unit 292. The waveform shaper 13 transmits all bands of the optical DMT signal without performing the VSB shaping according to the instruction of the waveform shaping instruction unit 292 when the transmission distance L is less than 40 km. The waveform shaper 13 performs the VSB shaping on the optical DMT signal according to the instruction of the waveform shaping instruction unit 292 when the transmission distance L is equal to or more than 40 km. That is, the waveform shaper 13 switches to any one of an operation that removes at least a part of the spectrum component in one of the sidebands of the optical DMT signal and an operation that transmits all bands of the optical DMT signal, depending on the parameter relating to the transmission distance L.

According to the above-mentioned configuration, as with the transmission system of FIG. 14, when the transmission distance L is less than 40 km, the VSB shaping is not performed, so that it is possible to achieve low power consumption and reduce the control time. Here, in this example, the transmission channel 91 for the control signal is provided separately from transmission medium 90 for the optical DMT signal, but the control signal may be transmitted to the transmission medium 90 used together with the optical DMT signal, as described later.

Figure 17:
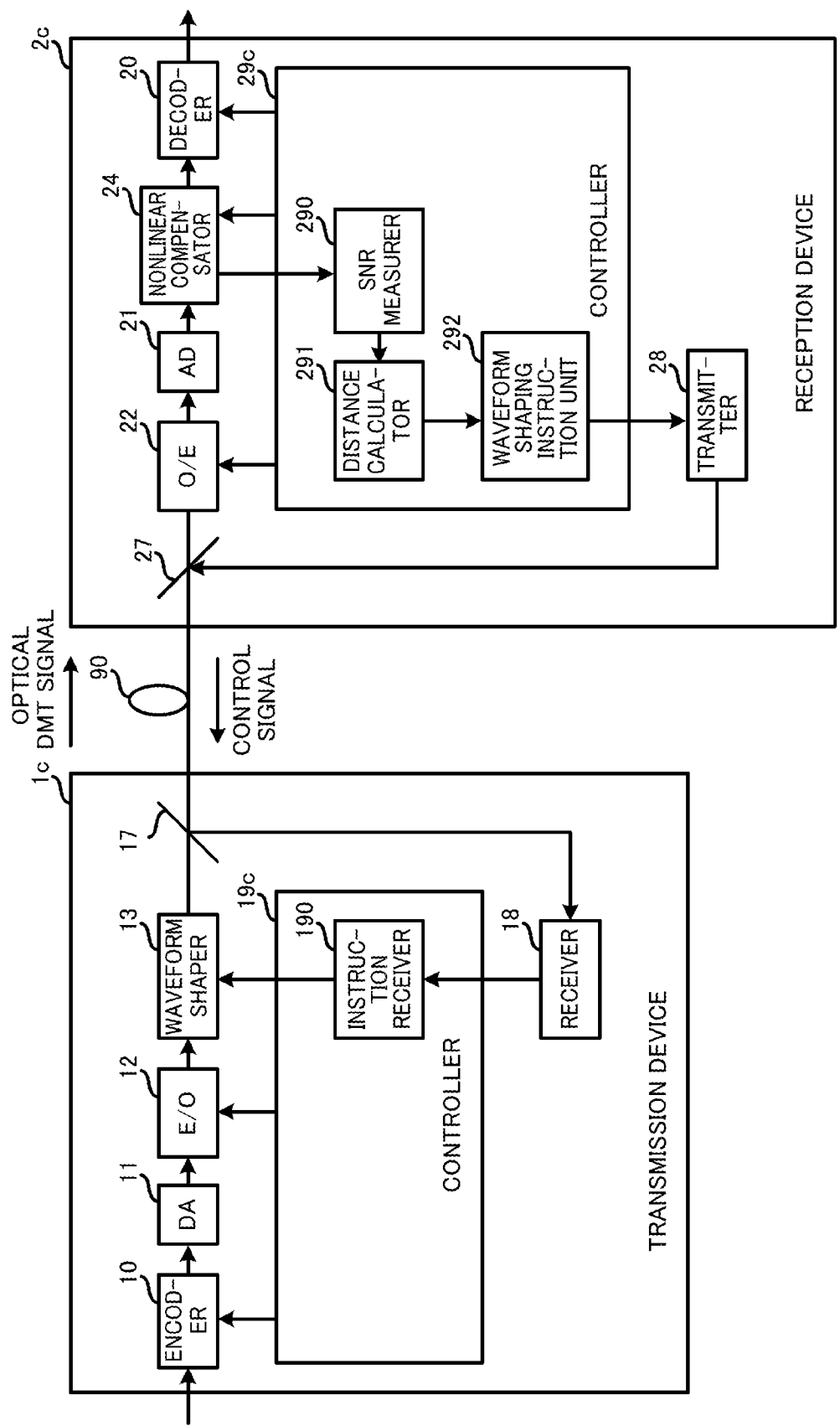
FIG. 17 is a diagram illustrating the configuration of a transmission system according to a second variation example of the second embodiment.

FIG. 17 is a diagram illustrating the configuration of a transmission system according to a second variation example of the second embodiment. In FIG. 17, elements common to those of FIG. 16 are designated by the same reference numerals and description thereof is omitted.

The reception device 2c includes the O/E converter 22, the AD converter 21, the nonlinear compensator 24, the decoder 20, the controller 29c, the transmitter 28 and a multiplexer 27. The multiplexer 27 is an optical coupler for example, and is connected between the transmission medium 90, and the O/E converter 22 and the transmitter 28. The multiplexer 27 leads the optical DMT signal from the transmission medium 90 to the O/E converter 22 and leads the control signal from the transmitter 28 to the transmission medium 90.

The transmission device 1c includes the encoder 10, the DA converter 11, the E/O converter 12, the waveform shaper 13, the controller 19c, the receiver 18 and a multiplexer 17. The multiplexer 17 is an optical coupler for example, and is connected between the transmission medium 90, and the waveform shaper 13 and the receiver 18. The multiplexer 17 leads the optical DMT signal from the waveform shaper 13 to the transmission medium 90 and leads the control signal from the transmission medium 90 to the receiver 18.

According to the above-mentioned configuration, the instruction of the waveform shaping instruction unit 292 is transmitted from the transmitter 28 to the receiver 18 via the transmission medium 90 used together with the optical DMT signal, as the control signal. Therefore, a facility cost of the transmission channel 91 is reduced, compared with the embodiment of FIG. 16. Here, each of the multiplexers 17 and 27 is not limited to the optical coupler, and may use an optical circulator, a wavelength multiplexing filter, a FBG (Fiber Bragg Grating), or the like.

Moreover, in the transmission system of the second embodiment illustrated in FIG. 10, the transmission power of the optical DMT signal of the transmission device 1c may be controlled based on the bit error rate.

Figure 18:
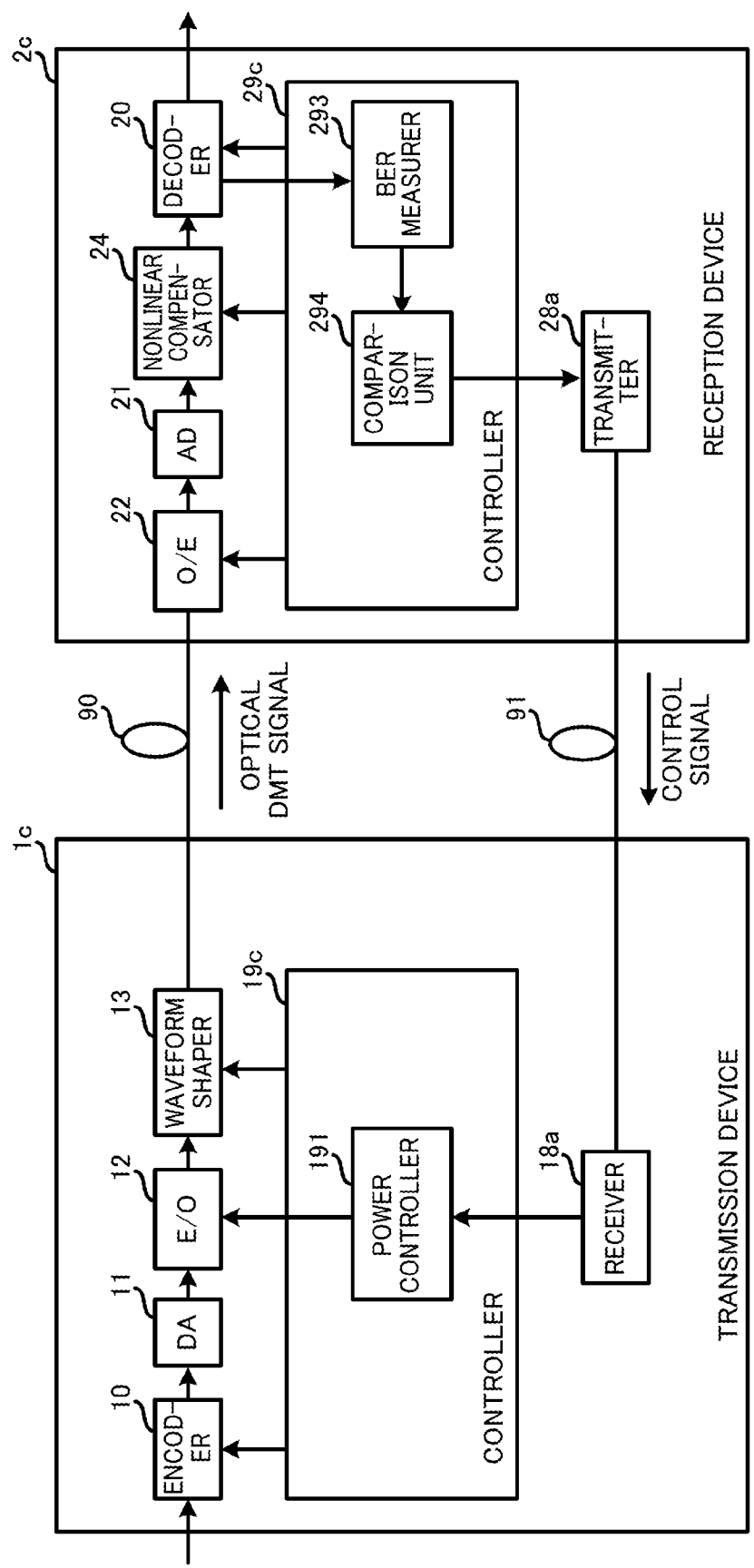
FIG. 18 is a diagram illustrating the configuration of a transmission system according to a third variation example of the second embodiment.

FIG. 18 is a diagram illustrating the configuration of a transmission system according to a third variation example of the second embodiment. In FIG. 18, elements common to those of FIG. 10 are designated by the same reference numerals and description thereof is omitted.

The reception device 2c includes the O/E converter 22, the AD converter 21, the nonlinear compensator 24, the decoder 20, the controller 29c and a transmitter 28a. The controller 29c includes a BER (Bit Error Rate) measurer 293 and a comparison unit 294.

The BER measurer 293 is an example of an error rate measurer, and measures the bit error rate of the DMT signal based on data of the client signal decoded by the decoder 20. As the characteristic of the measured bit error rate, the marks of the black dots of FIG. 9A are illustrated, for example. The comparison unit 294 compares the bit rate measured by the BER measurer 293 with the threshold value Rth, incorporates a comparison result into the control signal, and outputs the control signal to the transmitter 28a.

The transmitter 28a transmits the control signal to the transmission device 1c via the transmission channel 91 such as an optical fiber. Here, in this example, it is assumed that the transmission channel 91 for the control signal is provided separately from transmission medium 90 for the optical DMT signal.

The transmission device 1c includes the encoder 10, the DA converter 11, the E/O converter 12, the waveform shaper 13, the controller 19c and the receiver 18a. The controller 19c includes a power controller 191 that controls an output power of the optical DMT signal acquired by the conversion of the E/O converter 12, i.e., a transmission power. The receiver 18a receives the control signal from the transmitter 28a of the reception device 2c, and outputs the control signal to the power controller 191.

The power controller 191 acquires a measurement result of the bit error rate from the control signal, and controls the transmission power based on the measurement result. For example, the power controller 191 may control the transmission power so as to become a value Pm which is a minimum value of the bit error rate, with respect to the characteristic of the bit error rate illustrated in FIG. 9A. Thereby, it is possible to improve a fluctuation tolerance (margin) of the transmission power for the change of environmental conditions.

Moreover, with respect to the characteristic of the bit error rate illustrated in FIG. 9A, the power controller 191 may control the transmission power so as to become a minimum value Ps in a range X that the bit error rate is equal to or less than the threshold value Rth, to thereby reduce the power consumption.

Thus, in this example, the power controller 191 controls the power of the optical signal acquired by the conversion of the E/O converter 12 based on the error rate measured by the BER measurer 293, thereby improving the performance of the transmission device 1c. Here, in this example, the transmission channel 91 for the control signal is provided separately from transmission medium 90 for the optical DMT signal, but the control signal may be transmitted to the transmission medium 90 used together with the optical DMT signal, as described later.

Figure 19:
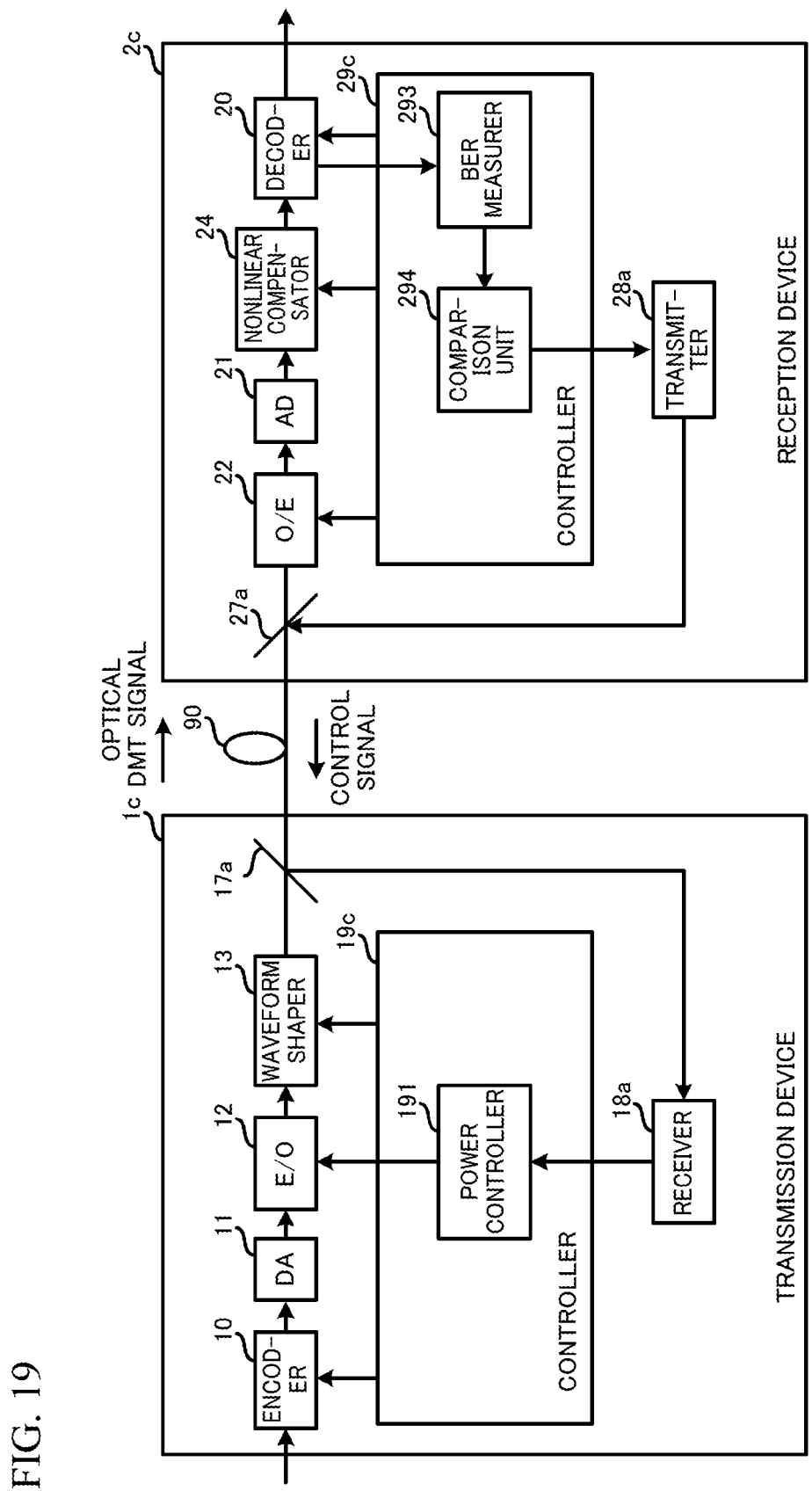
FIG. 19 is a diagram illustrating the configuration of a transmission system according to a fourth variation example of the second embodiment.

FIG. 19 is a diagram illustrating the configuration of a transmission system according to a fourth variation example of the second embodiment. In FIG. 19, elements common to those of FIG. 18 are designated by the same reference numerals and description thereof is omitted.

The reception device 2c includes the O/E converter 22, the AD converter 21, the nonlinear compensator 24, the decoder 20, the controller 29c, the transmitter 28a and a multiplexer 27a. The multiplexer 27a is an optical coupler for example, and is connected between the transmission medium 90, and the O/E converter 22 and the transmitter 28a. The multiplexer 27a leads the optical DMT signal from the transmission medium 90 to the O/E converter 22 and leads the control signal from the transmitter 28a to the transmission medium 90.

The transmission device 1c includes the encoder 10, the DA converter 11, the E/O converter 12, the waveform shaper 13, the controller 19c, the receiver 18a and a multiplexer 17a. The multiplexer 17a is an optical coupler for example, and is connected between the transmission medium 90, and the waveform shaper 13 and the receiver 18a. The multiplexer 17a leads the optical DMT signal from the waveform shaper 13 to the transmission medium 90 and leads the control signal from the transmission medium 90 to the receiver 18a.

According to the above-mentioned configuration, the comparison result of the comparison unit 294 is transmitted from the transmitter 28a to the receiver 18a via the transmission medium 90 used together with the optical DMT signal, as the control signal. Therefore, a facility cost of the transmission channel 91 is reduced, compared with the embodiment of FIG. 18. Here, each of the multiplexers 17a and 27a is not limited to the optical coupler, and may use an optical circulator, a wavelength multiplexing filter, a FBG (Fiber Bragg Grating), or the like.

An optical amplifier may be implemented into the above-mentioned transmission system to extend the transmission distance of the optical DMT signal.

FIG. 20A is a waveform diagram illustrating an example of the configuration of a transmission system implementing the optical amplifier. This transmission system employs the configuration based on the configuration example of FIG. 10, as an example. In FIG. 20A, elements common to those of FIG. 10 are designated by the same reference numerals and description thereof is omitted. Moreover, FIG. 20A illustrate only the elements on the channel of the DMT signal or the optical DMT signal.

A transmission device 1d includes the encoder 10, the DA converter 11, the E/O converter 12, an optical amplifier 15, a filter 16 and a VOA (Variable Optical Attenuator) 14. A reception device 2d includes an optical amplifier 25, a filter 26, the O/E converter 22, the AD converter 21, the nonlinear compensator 24 and the decoder 20. Here, marks Pa to Pc indicate positions where the waveform of the optical DMT signal described later is detected.

Each of the optical amplifiers 15 and 25 is a EDFA (Erbium Doped Fiber Amplifier), for example, and amplifies the optical DMT signal. Each of the optical amplifiers 15 and 25 outputs an ASE (Amplified Spontaneous Emission) light which is a noise. Each of the filters 16 and 26 performs filtering to the optical DMT signal. The VOA 14 is provided on the poststage of the filter 16 of the transmission device 1d, and attenuates the optical DMT signal amplified by the optical amplifier 15.

In the transmission device 1d, the optical amplifier 15 is connected to the poststage of the E/O converter 12, and the filter 16 is connected to the poststage of the optical amplifier 15. Moreover, in the reception device 2d, the optical amplifier 25 is connected to the transmission medium 90, and the filter 26 is connected to the poststage of the optical amplifier 25.

Each of the filters 16 and 26 performs the VSB shaping described above, or transmits all bands of the optical DMT signal (hereinafter, referred to as "DSB (Double Side Band) shaping"). The above-mentioned ASE noise and a nonlinear noise depending on the transmission power exist as noises to be superimposed on the DMT signal received by the reception device 2d. Noise amounts thereof differ in accordance with a combination of the VSB shaping and the DSB shaping of the filters 16 and 26, as described later.

FIG. 20B illustrates the comparison of the noise amounts of the nonlinear noise and the ASE noise in accordance with functions of the filters 16 and 26. In FIG. 20B, columns of "filter 16" and "filter 26" indicate the functions of the filters 16 and 26 (i.e., the VSB shaping or the DSB shaping), respectively. Columns of "position Pa" to "position Pc" indicate waveforms of the optical spectrum of the optical DMT signal at the positions Pa to Pc of FIG. 20A, respectively.

In each waveform of the optical spectrum, a horizontal axis denotes a wavelength λ, and a vertical axis denotes a signal power. Moreover, a mark Ba denotes a range of a transmission band of the filter 16, and a mark Bc denotes a range of a transmission band of the filter 26. A mark zn denotes the nonlinear noise, and a mark za denotes the ASE noise.

Each column of "nonlinear noise" denotes a ratio of a noise amount of the nonlinear noise to a standard value, and each column of "ASE noise" denotes a ratio of a noise amount of the ASE noise to a standard value. It is assumed that, when each of the filters 16 and 26 performs the DSB shaping, the ratio of the noise amount of the nonlinear noise to the standard value and the ratio of the noise amount of the ASE noise to the standard value become the standard value "1".

When the filter 16 performs the VSB shaping and the filter 26 performs the DSB shaping, the optical spectrum in the waveform at the position Pb becomes about half by the VSB shaping, so that the ratio of the noise amount of the nonlinear noise to the standard value becomes 0.5. However, the noise amounts of the nonlinear noise and the ASE noise are folded back by an influence of intensity detection in the O/E converter 22, so that the respective noise amounts double (see "double"). Therefore, the ratio of the noise amount of the nonlinear noise to the standard value becomes 1 (=0.5×2) ultimately, and the ratio of the noise amount of the ASE noise to the standard value becomes 2 (=1×2) ultimately.

When the filter 16 performs the DSB shaping and the filter 26 performs the VSB shaping, the nonlinear noise is directly transmitted to the reception device 2d by the DSB shaping of the filter 16, so that the ratio of the noise amount of the nonlinear noise to the standard value becomes 1. Since the ratio of the noise amount of the ASE noise to the standard value depends on the transmission bands Ba and Bc of the filters 16 and 26, the ratio of the noise amount of the ASE noise to the standard value becomes 1.

When the filters 16 and 26 perform the VSB shaping, the optical spectrum is reduced to half in both of the transmission device 1d and the reception device 2d, so that the ratio of the noise amount of the nonlinear noise to the standard value becomes 0.5. On the contrary, the ratio of the noise amount of the ASE noise to the standard value becomes 1.

Thus, when the filters 16 and 26 perform the VSB shaping, the noise amounts of the nonlinear noise and the ASE noise are reduced compared with other cases. When the filters 16 and 26 perform the VSB shaping, the filters 16 and 26 correspond to the waveform shapers 13 and 23. That is, the filter 16 is an example of a first filter, and removes at least a part of the spectrum component in one of the sidebands of the optical DMT signal. On the other hand, the filter 26 is an example of a second filter, and removes at least a part of the spectrum component in one of the sidebands of the optical DMT signal.

Moreover, the optical amplifier 15 is an example of a first optical amplifier, and amplifies the DMT signal converted into the optical signal by the E/O converter 12 before the spectrum correction is performed by the filter 16. The optical amplifier 25 is an example of a second optical amplifier, and amplifies the optical DMT signal before the optical DMT signal is converted into the electrical signal by the O/E converter 22.

In the above-mentioned embodiment, the VSB shaping is mentioned as a spectrum corrector in the transmission medium 90 for the optical DMT signal, but the spectrum corrector is not limited to the VSB shaping. Hereinafter, various spectrum correctors are mentioned together with the comparison of them.

FIG. 21 illustrates the comparison of a plurality of spectrum correctors. In FIG. 21, "loss", "configuration", "delay", "compensation amount" and "implementation" of each spectrum corrector are compared.

Each column of "loss" denotes a loss of a power of the optical DMT signal when a corresponding spectrum corrector is used. Each column of "configuration" denotes complexity of the configuration to realize the corresponding spectrum corrector. Each column of "delay" denotes a delay amount of the optical DMT signal when the corresponding spectrum corrector is used. Each column of "compensation amount" denotes a compensation amount of the corresponding spectrum corrector. Each column of "implementation" denotes the type of the transmission apparatus which can implement the corresponding spectrum corrector. As the type of the transmission apparatus, "transmission" denotes the transmission device 1a, 1b or 1c, "reception" denotes the reception device 2b, 2c or 2d, and "relay" denotes a relay device.

As the spectrum corrector, there are cited the VSB shaping (filter), the SSB shaping (filter), the SSB shaping (phase shift method), a DCF (Dispersion Compensating Fiber), a VIPA (Virtually Imaged Phased Array), the FBG an OPC (Optical Phase Conjugation) and an OFT (Optical Fourier Transform). The VSB shaping (filter) is an above-mentioned means. The SSB shaping (filter) is a means for removing all of the spectrum component in one of the sidebands of the optical DMT signal by filtering. The SSB shaping (phase shift method) is a means using the SSB modulator.

The VSB shaping (filter), the SSB shaping (filter) and the FBG have an advantage that the loss is small compared with other means. The VSB shaping (filter), the SSB shaping (filter), the DCF and the FBG have an advantage that the configuration is simple compared with other means. The VSB shaping (filter), the SSB shaping (filter), the SSB shaping (phase shift method), the VIPA and the FBG have an advantage that the delay is small compared with other means. The DCF has the largest delay in the above-mentioned means.

The compensation amounts of the DCF, the FBG and the OPC are fixed, and the compensation amount of the VIPA is variable. Moreover, the VSB shaping (filter), the SSB shaping (filter), the SSB shaping (phase shift method) and the OFT have an advantage that the compensation amount is arbitrary.

Moreover, only the relay device can implement the OPC, and only the reception device 2b, 2c or 2d can implement the OFT. On the contrary, the VSB shaping (filter), the SSB shaping (filter), the SSB shaping (phase shift method), the VIPA and the FBG have an advantage capable of being implemented in all of the transmission devices 1a, 1c and 1d and the reception devices 2b, 2c and 2d.

As described above, the reception device 2b according to the first embodiment includes the waveform shaper 23, the O/E converter 22 and the nonlinear compensator 24. The waveform shaper 23 performs the spectrum correction on the optical DMT signal. The optical DMT signal is converted from the electrical signal encoded by the DMT modulation. The O/E converter 22 converts the optical DMT signal on which the waveform shaper 23 has performed the spectrum correction, into the electrical signal. The nonlinear compensator 24 compensates for the nonlinear distortion with respect to the electrical signal (the DMT signal) converted by the O/E converter 22.

According to the above-mentioned configuration, the waveform shaper 23 performs the spectrum correction on the optical DMT signal transmitted from other device, so that the occurrence of the dip D of the frequency characteristic of the optical DMT signal is restrained. Moreover, since the nonlinear compensator 24 compensates for the nonlinear distortion with respect to the DMT signal converted by the O/E converter 22, the SNR characteristic decreased by the spectrum correction of the waveform shaper 23 is compensated.

Therefore, according to the reception device 2b of the first embodiment, the transmission characteristic is improved.

The transmission system according to the second embodiment includes the transmission device 1c that transmits the optical DMT signal, and the reception device 2c that receives the optical DMT signal. The transmission device 1c includes the encoder 10, the E/O converter 12 and the waveform shaper 13.

The encoder 10 generates the DMT signal. The E/O converter 12 converts the DMT signal into the optical signal. The waveform shaper 13 performs the spectrum correction on the optical signal converted by the E/O converter 12.

The reception device 2c includes the O/E converter 22 and the nonlinear compensator 24. The O/E converter 22 converts the optical DMT signal on which the waveform shaper 13 has performed the spectrum correction, into the electrical signal. The nonlinear compensator 24 compensates for the nonlinear distortion with respect to the DMT signal acquired by the conversion of the O/E converter 22.

Since the transmission system according to the second embodiment includes the same configuration as the above-mentioned reception device 2b, the same effect as the effect of the above-mentioned first embodiment is obtained.

The transmission system according to another embodiment includes the transmission device 1a that transmits the optical DMT signal, and the reception device 2b that receives the optical DMT signal. The transmission device 1a includes the encoder 10 and the E/O converter 12. The encoder 10 generates the DMT signal. The E/O converter 12 converts the DMT signal into the optical signal.

The reception device 2b includes the waveform shaper 23, the O/E converter 22 and the nonlinear compensator 24. The waveform shaper 23 performs the spectrum correction on the optical DMT signal transmitted from the transmission device 1a. The O/E converter 22 converts the optical DMT signal on which the waveform shaper 23 has performed the spectrum correction, into the electrical signal. The nonlinear compensator 24 compensates for the nonlinear distortion with respect to the DMT signal acquired by the conversion of the O/E converter 22.

Since the transmission system according to another embodiment includes the same configuration as the above-mentioned reception device 2b, the same effect as the effect of the above-mentioned first embodiment is obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A transmission apparatus comprising:
   a waveform shaper that performs spectrum correction on an optical signal converted from an electrical signal encoded by OFDM (Orthogonal Frequency Division Multiplexing);
   a converter that converts the optical signal on which the waveform shaper has performed the spectrum correction, into the electrical signal; and
   a nonlinear compensator that compensates for a nonlinear distortion with respect to the electrical signal converted by the converter.

2. The transmission apparatus as claimed in claim 1, wherein
   the waveform shaper removes at least a part of a spectrum component in one of sidebands of the optical signal to perform the spectrum correction.

3. The transmission apparatus as claimed in claim 2, further comprising:
   a transmission characteristic measurer that measures a transmission characteristic of the optical signal; and
   a calculator that calculates a parameter relating to a transmission distance of the optical signal from a result of the measurement;
   wherein the waveform shaper switches to any one of an operation that removes at least the part of the spectrum component in one of the sidebands of the optical signal and an operation that transmits all bands of the optical signal, depending on the parameter.

4. The transmission apparatus as claimed in claim 1, wherein
   the nonlinear compensator is a digital filter based on a polynomial structure of a Volterra series.

5. A transmission system comprising:
   a first transmission apparatus that transmits an optical signal; and
   a second transmission apparatus that receives the optical signal;
   the first transmission apparatus including:
      a generator that generates an OFDM (Orthogonal Frequency Division Multiplexing) signal;
      a first converter that converts the OFDM signal into the optical signal; and
      a waveform shaper that performs spectrum correction on the optical signal converted by the first converter;
   the second transmission apparatus including:
      a second converter that converts the optical signal on which the waveform shaper has performed the spectrum correction, into the OFDM signal; and
      a nonlinear compensator that compensates for a nonlinear distortion with respect to the OFDM signal acquired by the conversion of the second converter.

6. The transmission system as claimed in claim 5, wherein
   the waveform shaper removes at least a part of a spectrum component in one of sidebands of the optical signal to perform the spectrum correction.

7. The transmission system as claimed in claim 6, wherein
   the second transmission apparatus further includes an error rate measurer that measures an error rate of the optical signal, and
   the first transmission apparatus further includes a power controller that controls a power of the optical signal acquired by the conversion of the first converter based on the error rate measured by the error rate measurer.

8. The transmission system as claimed in claim 7, wherein
   the power controller controls the power of the optical signal so as to be a minimum value in a range that the error rate is equal to or less than a threshold value.

9. The transmission system as claimed in claim 6, wherein
   the first transmission apparatus further includes a first optical amplifier that amplifies the OFDM signal converted into the optical signal by the first converter before the waveform shaper performs the spectrum correction,
   the waveform shaper is a first filter that removes at least the part of the spectrum component in one of the sidebands of the optical signal,
   the second transmission apparatus further includes:

a second optical amplifier that amplifies the optical signal before the optical signal is converted into the OFDM signal by the second converter; and a second filter that removes at least a part of a spectrum component in one of sidebands of the optical signal amplified by the second optical amplifier.

10. The transmission system as claimed in claim 6, wherein the second transmission apparatus further including:

a transmission characteristic measurer that measures a transmission characteristic of the optical signal; and a calculator that calculates a parameter relating to a transmission distance of the optical signal from a result of the measurement;

wherein the waveform shaper switches to any one of an operation that removes at least the part of the spectrum component in one of the sidebands of the optical signal and an operation that transmits all bands of the optical signal, depending on the parameter.

11. The transmission system as claimed in claim 5, wherein the nonlinear compensator is a digital filter based on a polynomial structure of a Volterra series.

12. A transmission system comprising:

a first transmission apparatus that transmits an optical signal; and a second transmission apparatus that receives the optical signal;

the first transmission apparatus including:

a generator that generates an OFDM (Orthogonal Frequency Division Multiplexing) signal; and a first converter that converts the OFDM signal into the optical signal;

the second transmission apparatus including:

a waveform shaper that performs spectrum correction on the optical signal transmitted from the first transmission apparatus;

a second converter that converts the optical signal on which the waveform shaper has performed the spectrum correction, into the OFDM signal; and a nonlinear compensator that compensates for a nonlinear distortion with respect to the OFDM signal acquired by the conversion of the second converter.

13. The transmission system as claimed in claim 12, wherein the waveform shaper removes at least a part of a spectrum component in one of sidebands of the optical signal to perform the spectrum correction.

14. The transmission system as claimed in claim 13, wherein the second transmission apparatus further including:

a transmission characteristic measurer that measures a transmission characteristic of the optical signal; and a calculator that calculates a parameter relating to a transmission distance of the optical signal from a result of the measurement;

wherein the waveform shaper switches to any one of an operation that removes at least the part of the spectrum component in one of the sidebands of the optical signal and an operation that transmits all bands of the optical signal, depending on the parameter.

15. The transmission system as claimed in claim 12, wherein the nonlinear compensator is a digital filter based on a polynomial structure of a Volterra series.

* * * * *